US006925595B1

(12) United States Patent
Whitledge et al.

(10) Patent No.: US 6,925,595 B1
(45) Date of Patent: Aug. 2, 2005

(54) METHOD AND SYSTEM FOR CONTENT CONVERSION OF HYPERTEXT DATA USING DATA MINING

(75) Inventors: James R. Whitledge, Naperville, IL (US); Kenneth F. Carlino, Carol Stream, IL (US)

(73) Assignee: Spyglass, Inc., Naperville, IL (US)

( * ) Notice: Subject to any disclaimer, the term of this patent is extended or adjusted under 35 U.S.C. 154(b) by 0 days.

(21) Appl. No.: 09/129,308

(22) Filed: Aug. 5, 1998

(51) Int. Cl.[7] .................. G06F 15/00; G06F 17/21; G06F 7/00; G06F 15/16
(52) U.S. Cl. ................ 715/513; 715/501.1; 707/4; 707/10; 709/217; 709/218; 709/219
(58) Field of Search .............. 715/501.1, 513; 707/4, 10, 513; 709/217–219

(56) References Cited

U.S. PATENT DOCUMENTS

| | | | |
|---|---|---|---|
| 5,283,887 A | 2/1994 | Zachery | 707/513 |
| 5,694,580 A | 12/1997 | Narita et al. | 710/1 |
| 5,727,159 A | 3/1998 | Kikinis | 709/238 |
| 5,742,762 A | 4/1998 | Scholl et al. | 709/200 |
| 5,745,360 A | 4/1998 | Leone et al. | 707/513 |
| 5,802,299 A | 9/1998 | Logan et al. | 709/218 |
| 5,809,415 A | 9/1998 | Rossmann | 370/352 |

(Continued)

FOREIGN PATENT DOCUMENTS

| | | |
|---|---|---|
| EP | 0778534 A1 | 3/1996 |
| EP | 0926610 A1 | 12/1997 |
| EP | 0947935 A2 | 2/1999 |
| EP | 0969389 A2 | 6/1999 |
| EP | 0718783 A1 | 12/1999 |
| GB | 2329310 A | 7/1998 |
| GB | 2339374 A | 6/1999 |
| WO | WO 97/18635 A2 | 9/1996 |
| WO | WO 97/17662 A1 | 11/1996 |
| WO | WO 97/18516 A1 | 11/1996 |
| WO | WO 98/33130 | 12/1997 |
| WO | WO 98/36344 | 1/1998 |
| WO | WO 99/45793 A1 | 4/1998 |
| WO | 9833130 | 7/1998 |
| WO | WO 99/35595 | 12/1998 |
| WO | WO 99/35802 A2 | 1/1999 |
| WO | WO 99/57657 A1 | 4/1999 |
| WO | WO 99/61984 | 5/1999 |

OTHER PUBLICATIONS

Microstrategy: DSS broadcaster—the industry's first information broadcast server, M2 Presswire, Dow Jones Interactive pp. 1–4, dated Mar. 20, 1998.*

Spyglass Prism Concepts And Applications, 1997 Spyglass Inc., pp. 1–7.*

(Continued)

*Primary Examiner*—William L. Bashore
(74) *Attorney, Agent, or Firm*—Schwegman, Lundberg, Woessner & Kluth, P.A.

(57) ABSTRACT

Method and system for content conversion of electronic data using data mining. A user is able select one or more hypertext elements from one or more hypertext electronic document for conversion based on user conversion preferences. For example, a user selects one or more display elements from one or more "web-pages" from the World-Wide-Web on the Internet or an intranet. The hypertext elements are extracted from one or more hypertext electronic documents and converted into a format suitable for display on a user device based on user conversion preferences. Selected hypertext elements are extracted and converted using data mining conversion operations. The data mining conversion operations allow a user to extract only desired display information displayed from a hypertext element and convert the display information into a format different than that defined for the original electronic document. The converted display information is appropriate for a user device such as hand-held, wireless phone, personal digital assistant, or other device.

1 Claim, 14 Drawing Sheets

U.S. PATENT DOCUMENTS

| | | | |
|---|---|---|---|
| 5,826,258 A | * 10/1998 | Gupta et al. | 707/4 |
| 5,848,415 A | 12/1998 | Guck | 707/10 |
| 5,870,549 A | 2/1999 | Bobo, II | 709/206 |
| 5,875,327 A | 2/1999 | Brandt et al. | 713/1 |
| 5,889,516 A | 3/1999 | Hickey et al. | 345/333 |
| 5,895,471 A | 4/1999 | King et al. | 707/104 |
| 5,911,776 A | 6/1999 | Guck | 709/217 |
| 5,913,214 A | * 6/1999 | Madnick et al. | 707/10 |
| 5,918,013 A | 6/1999 | Michdoll et al. | 709/217 |
| 5,923,738 A | 7/1999 | Cardillo, IV et al. | 379/93.25 |
| 5,930,341 A | 7/1999 | Cardillo, IV et al. | 379/93.25 |
| 5,937,041 A | 8/1999 | Cardillo, IV et al. | 379/93.25 |
| 5,968,117 A | 10/1999 | Shuetze | 709/206 |
| 5,983,247 A | 11/1999 | Yamanaka et al. | 707/526 |
| 5,996,022 A | 11/1999 | Krueger et al. | 709/247 |
| 6,011,546 A | 1/2000 | Bertram | 345/327 |
| 6,014,712 A | 1/2000 | Islam et al. | 709/246 |
| 6,055,522 A | 4/2000 | Krishna et al. | 705/517 |
| 6,098,085 A | 8/2000 | Blonder et al. | 707/531 |
| 6,151,601 A | * 11/2000 | Papierniak et al. | 707/10 |

OTHER PUBLICATIONS

Newsflash: Spyglass Prism Content Conversion Solution Debuted at Embedded Systems East '97, Mar. 10, 1997 Spyglass Inc., pp. 1–3, retrieved on May 24, 2000 from <url: http://www.spyglass.com/newsflash/releases/97/031097prism.html>.*

Kurz, A., Data warehousing within intranet: prototype of a web–based executive information system, IEEE Database and Expert Systems Applications, pp. 627–632. Sep. 1997.*

Ashish, N. et al., Semi–automatic wrapper generation for Internet information sources, IEEE Cooperative Information Systems, pp. 160–169. Jun. 1997.*

Richard Han et al., *Dynamic Adaptation in an Image Transcoding Proxy for Mobile Web Browsing,* IEEE Personal Communications, Dec. 1998, pp. 9–17.

Timothy W. Bickmore, *Digestor: Device–Independent Access to the World Wide Web,* <http://www.fxpal.com/papers/bic971>, Mar. 3, 2003, pp. 1–8.

Timothy W. Bickmore, "Digestor: Device–Independent Access To The World Wide Web," Sixth International World Wide Web Conference, Santa Clara, California, Apr. 1997, pp. 655 to 663.

Takao Shimada, Naoko Iwamia, Takewo Tomokane, "Interactive Scaling Control Mechanism For World Wide Web Systems," Sixth International World Wide Web Conference, Santa Clara, California, Apr. 1997, pp. 489 to 499.

Bill N. Schilt, Fred Douglas, Dabid M. Kristol, Paul Krzyzanowski, James Sienicki, John A. Trotter, "Tele Web: Loosely Connected Access To The World Wide Web," Fifth International World Wide Web Conference, May 1996, Paris, France, pp. 1431 to 1444.

Armando Fox, Eric A. Brewer, "Reducing WWW Latency And Bandwidth Requirements By Real–Time Distillation," Fifth International World Wide Web Conference, May 1996, Paris, France, pp. 1445 to 1456.

"Quick Web, New Intel Technology Delivers Web Pages Faster, Intel Technologies," Jan. 19, 1998, pp. 1 to 3, http://www.intel.com/pressroom/archive/releases/IN011998.HTM.

"The TranSend Service," University of California at Berkeley, Jan. 1998, pp. 1 to 7, http://transend.cs.berkley.edu.

"Document Object Model (Core) Level 1," Nov. 19, 1997, WD–DOM/level–one–core–971209, pp. 1 to 25, http://www.w3.org/TR.WD/DOM/level–one–core–971209

Scott Isaacs, "Inside Dynamic HTML," Chapter 7, pp. 167 to 187, Microsoft Press, 1997.

White paper "IBM Transcoding Solution and Services," IBM Corporation, May 1999.

John R. Smith, Rakesh Mohan and Chung–Sheng Li, "Transcoding Internet Content For Heterogeneous Client Devices," *Proc. IEEE Int. Conf. On Circuits and Syst. (ISCAS),* May 1998.

Rakesh Mohan, John R. Smith and Chung–Sheng Li, "Adapting Multimedia Internet Content For Universal Access," *IEEE Transactions on Multimedia,* Mar. 1999, pp. 104–114.

Proposal for a Handheld Device Markup Language, W3C, pp. 1–4.

Submission Request to W3C, W3C, pp. 1–2.

HDML, Takes Two, Oakes, Wired.com, pp. 1–3.

Spyglass Prism 1.0, 1997.

Spyglass Product Strategy: Making Devices Work with the Web, Spyglass, White Paper, 1997.

Spyglass Prism, Concepts and Applications, 1997.

Spyglass Prism Content Conversion Solution Debuted at Embedded Systems East'97, Mar. 10, 1997.

U.S. Robotics Exhibits Spyglass Prism Dynamic Content Conversion Solution at CelluCommEXPO'97, May 20, 1997.

Spyglass Prism Allows Non–PC Devices to Display Content up to Four Times Easier, Sep. 16, 1997.

Spyglass Ships Spyglass Prism 1.0 Dynamic Content Conversion Solution; Revolutionary Product Delivers Existing Web Content to Non–PC Devices, Sep. 16, 1997.

Spyglass Prism 1.0 Significantly Improves Internet Performance on Windows CE 2.0 Devices, Sep. 30 1997.

Industry–leading SurfWatch Content Filtering Delivered for Spyglass Prism, Oct. 1, 1997.

Nokia Selects Spyglass Prism Content Conversion Technology For Future Wireless Data Products, Oct. 21, 1997.

Spyglass Internet Infrastructure Products Open Web to New Devices by Optimizing Performance and Enhancing User Experience, Dec. 2, 1996.

* cited by examiner

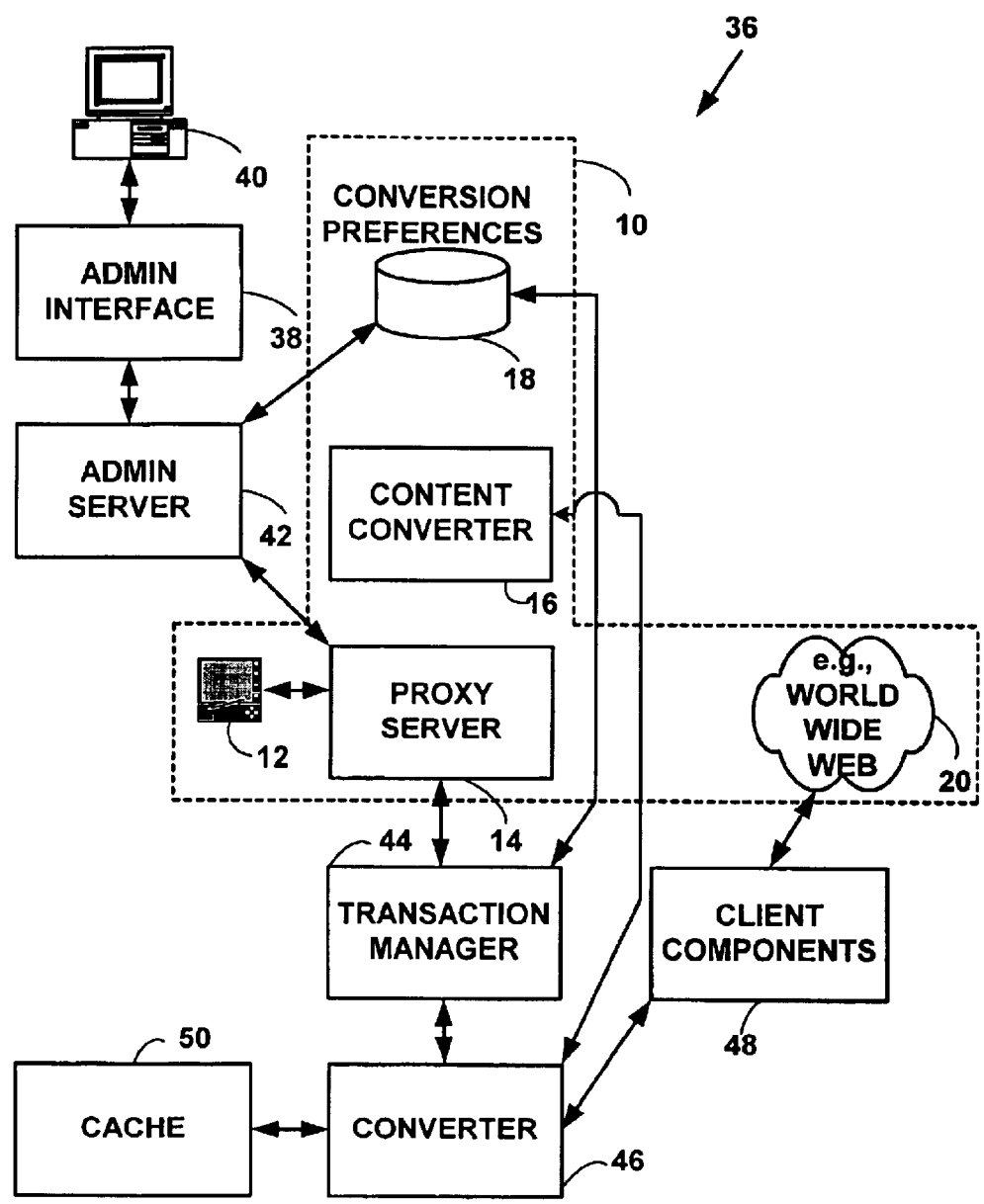

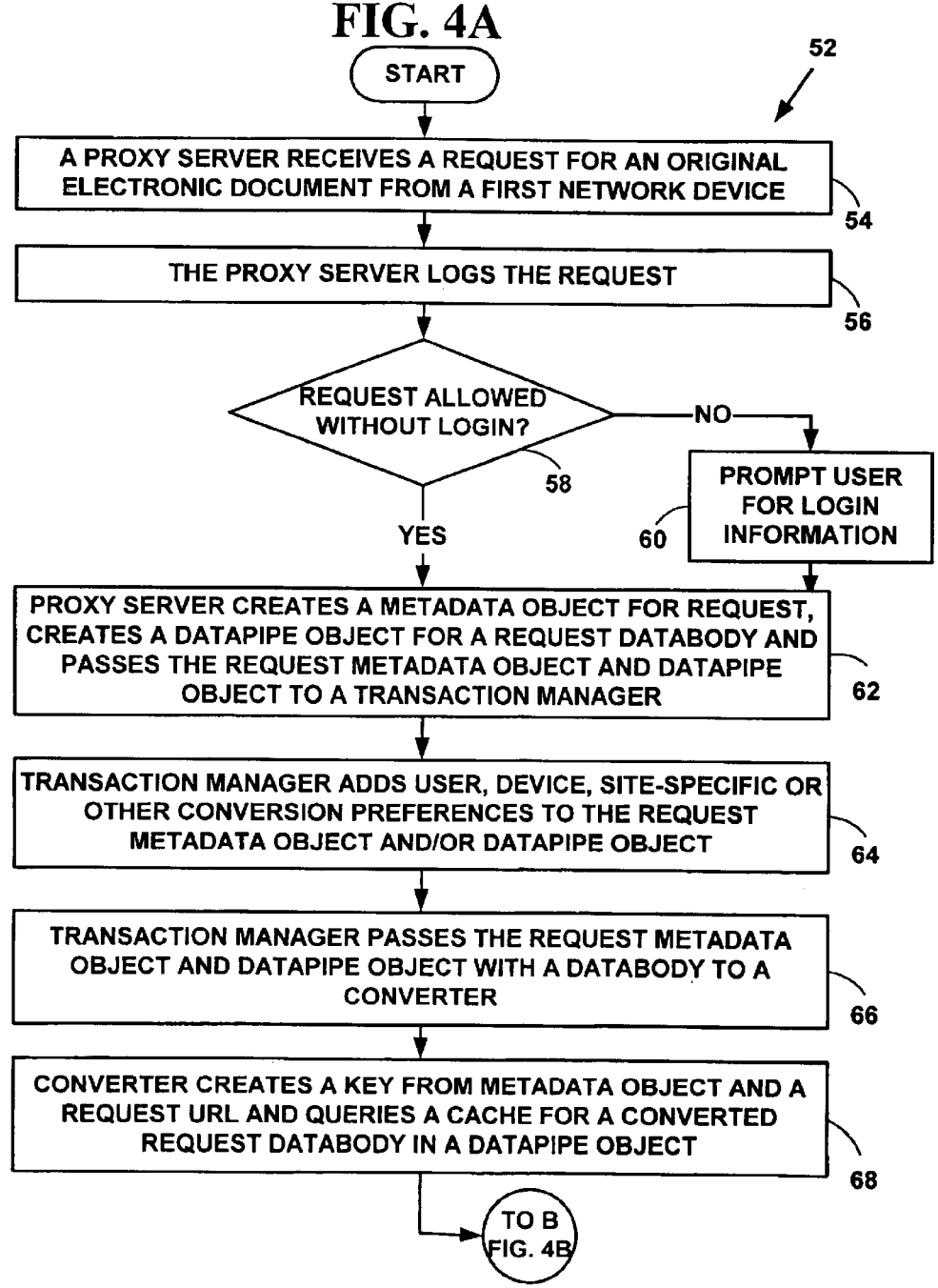

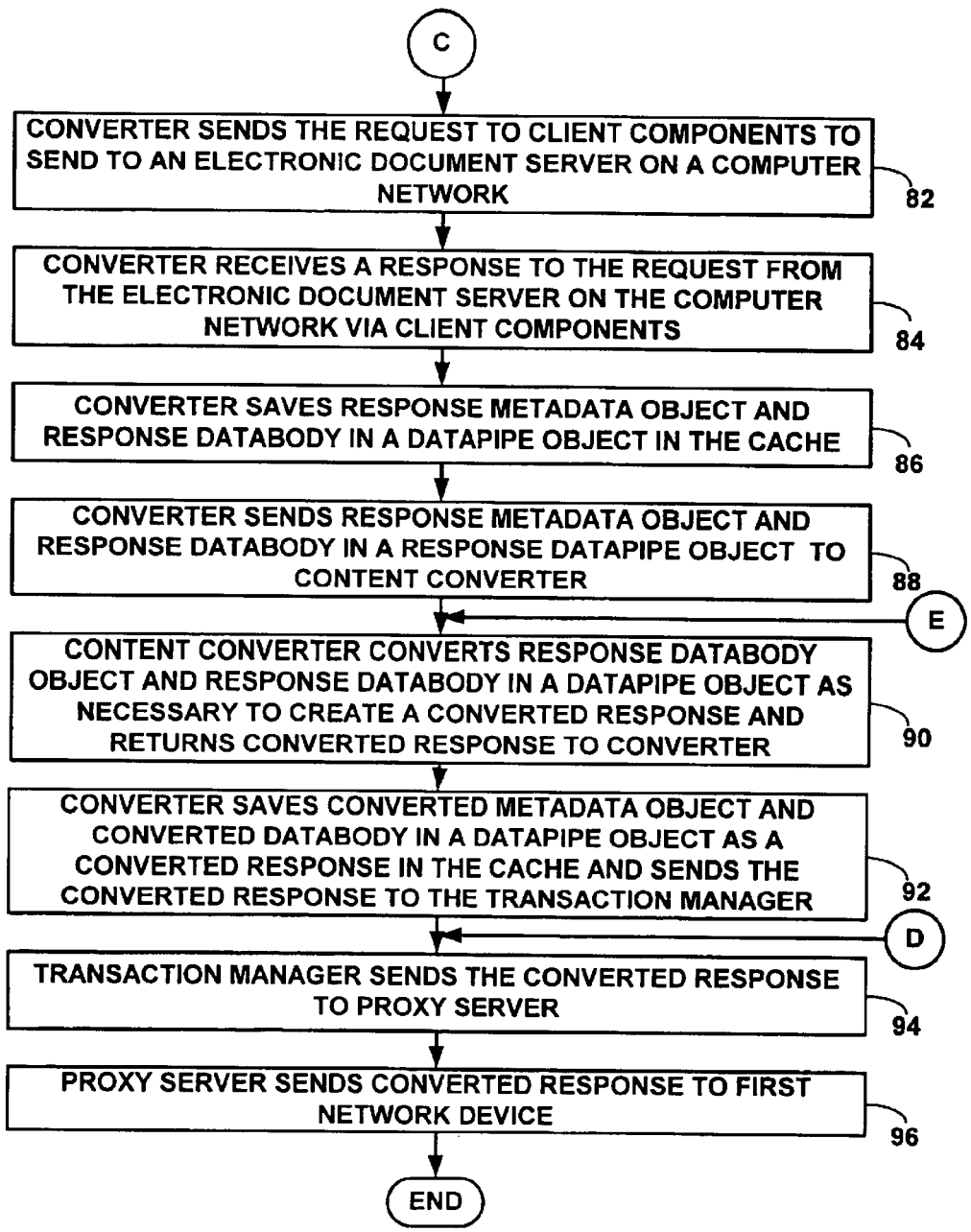

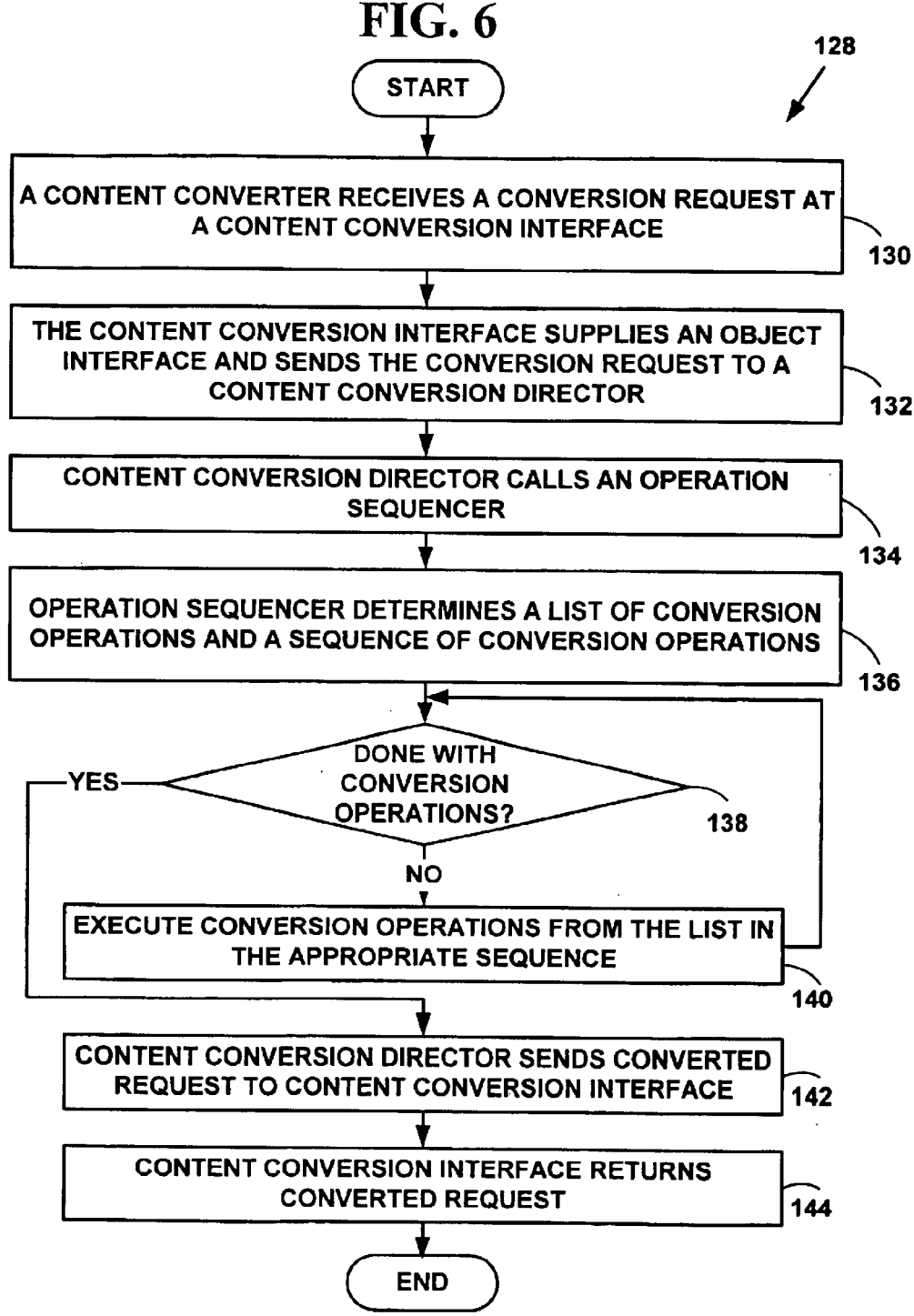

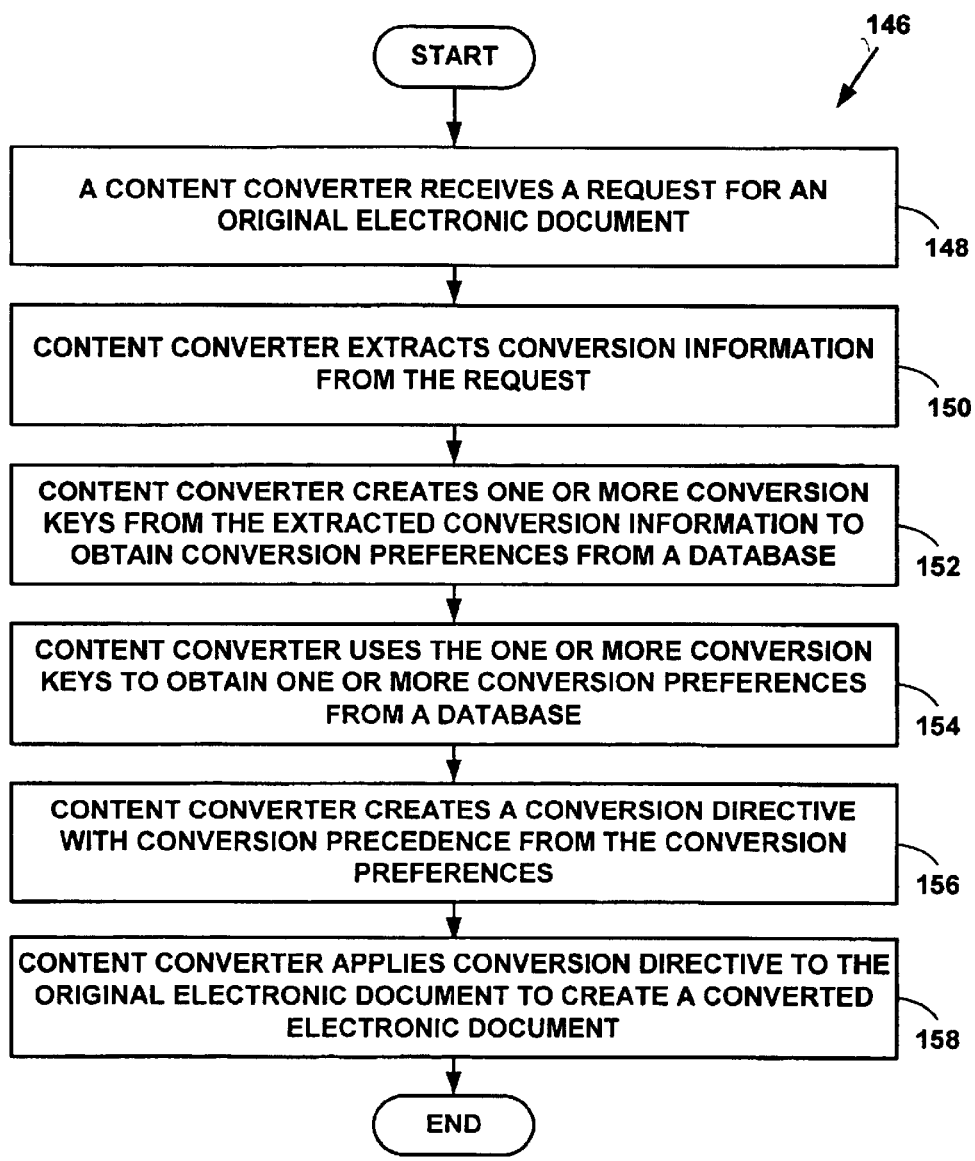

SUPERVGA RESOLUTION DISPLAY

PDA GRAYSCALE DISPLAY

HTML
DOCUMENT OBJECT MODEL

METHOD AND SYSTEM FOR CONTENT CONVERSION OF HYPERTEXT DATA USING DATA MINING

COPYRIGHT AUTHORIZATION

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF INVENTION

This invention relates to computer networks. More specifically, it relates to a method and system for converting the content of electronic data for a desired network device using data mining.

BACKGROUND OF THE INVENTION

The Internet is a world-wide network of interconnected computers. The World-Wide-Web is an information system on the Internet designed for electronic document interchange. Electronic documents on the World-Wide-Web are typically stored in files that include text, hypertext, references to graphics, animation, audio, video and other electronic data. The structure of hypertext documents is defined by document markup languages such as Standard Generalized Markup Language ("SGML"), Hyper Text Markup Language ("HTML"), eXtensible Markup Language ("XML"), Virtual Reality Markup Language ("VRML") and others.

As is known in the art, a hypertext document includes markup codes called "tags." Tags define the structure of a hypertext document and typically includes at least a "begin" tag name enclosed by a delimiter and, in many instances, an "end" tag name enclosed by a delimiter. For example, the markup tag "<H1>" signifies the beginning of a Hyper Text Markup Language first level header, and the markup tag "</H1>" signifies the end of a Hyper Text Markup Language first level header. However, the Hyper Text Markup Language image tag "<IMG . . . >" ends with the closing tag delimiter ">" and does not use an end tag in the format "<\IMG>". Other markup languages have similar tags used to create hypertext documents.

Markup languages allow references to additional content besides text including graphics, animation, audio, video and other electronic data. The Hyper Text Markup Language allows use of graphical images in a hypertext document with an image "<IMG>" tag. For example, an exemplary Hyper Text Markup Language image tag <IMG SRC="logo.jpg"> allows a graphical logo image stored in a Joint Pictures Expert Group file "logo.jpg" to be displayed.

Hypertext documents from the World-Wide-Web are typically displayed for a user with a software application called a "browser" such as Internet Explorer, by Microsoft Corporation of Redmond Wash., or Netscape Navigator, by Netscape Communications of Mountain View, Calif., and others. A browser typically parses a hypertext document and converts hypertext, including markup tags, into a visual display of text, graphics, animation, audio, video, etc., for display on a device such as a personal computer display.

Additional content is retrieved in a hypertext document from other sources using "hyperlink" references within hypertext documents. For example, an exemplary Hyper Text Markup Language hyperlink tag "<A HREF="http://www.spyglass.com/logo.mov">" provides a hyperlink to a movie file "logo.mov." When a user selects the link (e.g., with a mouse click) in a hypertext document, the movie file "logo.mov" is located using a Uniform Resource Locator ("URL") from the location "www.spyglass.com." Hyper Text Transfer Protocol (e.g., "HTTP") is used as the transfer protocol.

Transfer protocols such as Hyper Text Transfer Protocol ("HTTP"), File Transfer Protocol ("FTP"), Gopher, and others provide a means for transferring hypertext documents or additional content from other locations on the World-Wide-Web. Hyper Text Transfer Protocol is one primary protocol used to transfer information on the World-Wide-Web. Hyper Text Transfer Protocol is a protocol that allows users to connect to a server, make a hypertext request, get a response, and then disconnect from the server. File Transfer Protocol is a protocol that provides access to files on remote systems. Using File Transfer Protocol, a user logs onto a system, searches a directory structure and downloads or uploads a file. Gopher is a protocol similar to File Transfer Protocol. Gopher provides a series of menus linked to files containing actual hypertext.

Content providers on the World-Wide-Web provide custom content using attributes from markup language tags. For example, the Hyper Text Markup Language IMG tag includes the following attributes: ISMAP, a selectable image map; SRC, a source Uniform Resource Locator of an image; ALT, a text string used instead of an image; ALIGN, for alignment of an image (e.g., left, middle, right); VSPACE, the space between an image and the text above and below it; HSPACE, the space between and image and the text to its left or right; WIDTH, the width in pixels of an image; HEIGHT, the height in pixels of an image; and a few other attributes depending on the browser being used (e.g., BORDER and LOWSRC in a Netscape browser). In addition, other content attributes can be modified such as one of 256 colors (e.g., TEXT="blue," or TEXT="0xa6caf0" for sky blue), font face (e.g., FONT FACE="Times Roman"), character formatting, (e.g., <B>text</B> for bold text), etc.

Most of the electronic documents developed for the World-Wide-Web assume that users will view the content of the electronic document with a browser on a desktop computer screen with a standard "SuperVGA" resolution (e.g., 800×600 pixel resolution with 256 or more available colors). A user can alter display of selected electronic 410 document content by changing browser attributes (e.g., color of text, size of text). However, the changeable content is limited by changeable attributes in a browser being used.

There are a number of problems with using electronic documents developed for the World-Wide-Web based on the assumption of viewing with standard "SuperVGA" resolution. A user with a hand-held computer, personal digital assistant ("PDA") or other hand-held device, such as wireless phone, may desire to view electronic documents from the World-Wide-Web. However, most hand-held devices have a display with a resolution that is less than SuperVGA (e.g., less than 800×600 pixel resolution and less than 256 colors) and typically do not support color. Thus, the content of electronic documents will not be properly displayed and may be difficult to view based on the original hypertext content.

One solution is to store several versions of an electronic document for different devices. However, this often makes administration of the electronic documents very difficult.

Multiple copies of electronic documents also waste a tremendous amount of storage space on electronic document servers on the World-Wide-Web. The dynamic nature of the World-Wide-Web also means that new content types are constantly being introduced. Multiple copies of existing electronic documents must be constantly manipulated.

Another solution is to provide content conversion applications to convert electronic documents to match the capabilities of a device or the preferences of a user. One purpose of converting electronic documents is to provide information to users in a format different from that provided by the initial electronic document provider. Examples include scaling images for a specific device with a small display or converting text to speech for a visually impaired user. Most content conversion applications depend on a user-device to render the electronic document being displayed. As a result, each hand-held device is required to have a copy of a desired content conversion application.

There have been attempts to provide content conversion applications for electronic documents for the World-Wide-Web. QuickWeb Technology, by Intel Corporation of Santa Clara, Calif., analyzes a hypertext document for graphic images and then compresses bits of image data so that the images can be transmitted faster to a user's device. QuickWeb Technology also caches images. After a user's first request, an image is cached by QuickWeb. Subsequent requests for the same image are delivered from the cached source instead of a remote content server. QuickWeb Technology is limited to converting images and currently does not allow conversion of other content information.

TranSend, by the University of California at Berkeley, Calif., provides a conversion proxy that converts images in an electronic document by reducing image quality. Although the resulting images are of a lower quality, an original image can also be recovered. The TranSend Proxy distills images for faster electronic document display from the World-Wide-Web. TranSend limits user configurations to turning the proxy on and off and reducing image quality for faster transmission. TranSend is also currently limited to converting images only and does not allow conversion of other information.

One aspect of content conversion of hypertext electronic documents allows one or more parts of a first hypertext electronic document to be selected for display in a second hypertext electronic document. For example, the Microsoft Network, by Microsoft Corporation of Redmond, Wash., allows a user to create a customized home page by selecting display items such as news, stock quotes, sports, weather and other information. The display items are retrieved from other hypertext electronic documents on the World-Wide-Web on the Internet and displayed by a browser in a pre-determined format on a customized home page.

However, to select hypertext content, short lists of display items that can be used to customize a home page are provided. For example, on a given network, a list of sports information sites may only include ESPN and MSNBC sports related sites. If it is desired to receive information from a Sports Illustrated sports information site and the site was not in the short list of display items provided to customize a home page, then information from the Sports Illustrated site could not be included on the customized home page.

To display selected customized content, browsers known in the art typically create a Document Object Model ("DOM") representing elements in a hypertext electronic document (e.g., Hyper Text Markup Language elements). A hypertext element is a fundamental component of a structure of a hypertext electronic document. Hypertext elements typically are marked by selected start tags and end tags as was described above. Selected custom content is typically included in one or more hypertext elements.

Browsers known in the art typically do not create an entirely new hypertext electronic document when hypertext elements representing desired content are selected. Instead such browsers manipulate the selected hypertext elements obtained from another hypertext electronic document using Visual Basic Script ("VBScript"), JavaScript, or other scripting languages as the hypertext elements are displayed for a user. Dynamic Hypertext Markup Language ("DHTML") by Microsoft has also been used to allow manipulation of selected hypertext elements. More information on Microsoft products can be obtained at the URL "www.microsoft.com."

Browser manipulation of hypertext elements typically requires additional processing power, memory, display capabilities for SuperVGA resolution and one or more script languages to display selected hypertext elements. As a result, browser manipulation of selected hypertext elements may not be appropriate for a hand-held device or other small device with limited processing power, limited memory or display capabilities of less than SuperVGA resolution. In addition, a hand-held device may only be capable of using a striped down version of a browser without enough functionality to properly manipulate selected hypertext elements.

Thus, it is desirable to provide selected hypertext elements in a format suitable for display on a user network device. The hypertext elements should be selectable from virtually any electronic document server on the World-Wide-Web on the Internet, an intranet or other network and converted for display on a user network device based on conversion preferences selected by a user.

SUMMARY OF THE INVENTION

In accordance with preferred embodiment of the present invention, some of the problems associated with display of selected hypertext elements are overcome. A method and system of content conversion using data mining is presented. In one preferred embodiment of the present invention, the content conversion method includes receiving a first hypertext electronic document on a second network device (e.g., a content converter) on a first network, from a third network device (e.g., an electronic document server) on a second network (e.g., World-Wide-Web on the Internet, or an intranet). A document object model is created from the first hypertext electronic document. One or more selected hypertext elements are extracted from the document object model using one or more data mining expressions from a data mining conversion language. One or more of the extracted hypertext elements are converted using one or more data mining operations from the data mining conversion language. A second hypertext electronic document is created on the second network device including one or more converted hypertext elements.

In one preferred embodiment of the present invention, the content conversion system includes a content converter, a document object model, a proxy server, and a data mining conversion language. The content converter converts a first hypertext electronic document into a second hypertext electronic document using a data mining conversion language. The document object model stores hypertext elements of a first hypertext electronic document. The proxy server communicates with multiple network devices making requests for first hypertext electronic documents, communicates with a content converter and with multiple electronic document servers on a network providing first hypertext electronic documents. The data mining conversion language with multiple data mining conversion expressions and multiple data mining conversion operations converts original hypertext elements into converted hypertext elements.

The method and system of a preferred embodiment of the present invention may allow virtually any hypertext elements to be selected from a hypertext electronic document. Selected hypertext elements are extracted and converted into a desired format suitable for display on a user device based on conversion preferences selected by a user and not generic conversion preferences provided to all users (e.g., one or more display items are selected from a "web-page," and the components are extracted and converted into a new display format based on conversion preferences specifically selected by a user).

The foregoing and other features and advantages of a preferred embodiment of the present invention will be more readily apparent from the following detailed description, which proceeds with references to the accompanying drawings.

BRIEF DESCRIPTION OF THE DRAWINGS

A preferred embodiment of the present invention is described with reference to the following drawings, wherein:

FIG. 3 is a block diagram illustrating one exemplary content conversion system;

FIGS. 4A, 4B and 4C are a flow diagram illustrating a method for content conversion using the content conversion system of FIG. 3;

FIG. 6 is a flow diagram illustrating a method for content conversion with the # content converter illustrated in FIG. 5;

FIG. 7 is a block diagram illustrating a method for content conversion using conversion preferences;

DETAILED DESCRIPTION OF PREFERRED EMBODIMENTS

Content Conversion System

Figure 1:
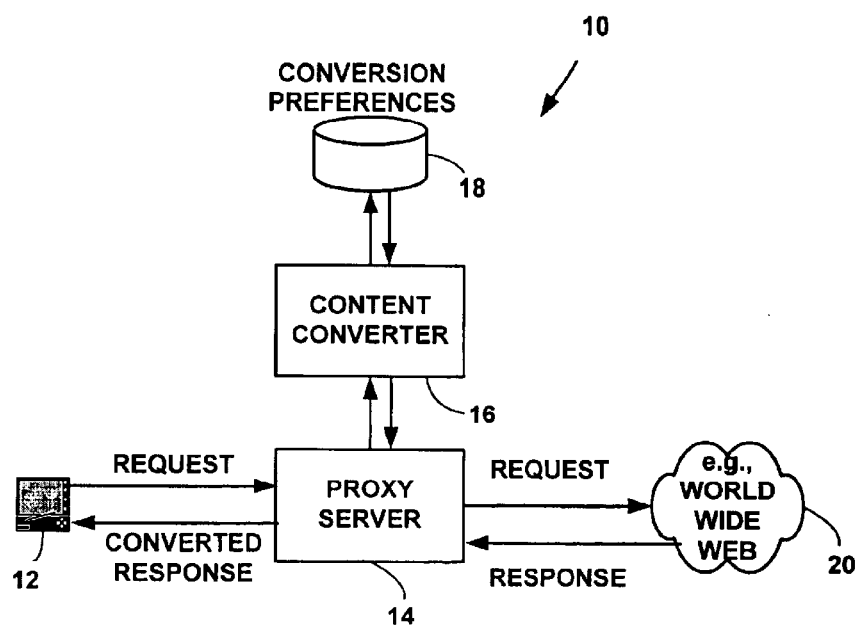
FIG. 1 is a block diagram generally illustrating a content conversion system.

FIG. 1 is a block diagram illustrating a content conversion system 10. Content conversion system 10 includes multiple components. A first network device 12 requests original electronic documents. The first network device 12 includes a display that is less that SuperVGA resolution (i.e., less than 800×600 pixel resolution or less than 256 colors). However, a preferred embodiment of the present invention can also be practiced with a first network device that has a display with SuperVGA resolution.

As is known in the art and is described above, an electronic document includes text, hypertext, graphical data or references to graphical data images, audio, video and other content. A hypertext document includes markup codes called "tags." The structure of hypertext documents is defined by document markup languages such as Standard Generalized Markup Language ("SGML"), Hyper Text Markup Language ("HTML"), eXtensible Markup Language ("XML"), Virtual Reality Markup Language ("VRML") and others. Markup languages also allow references to additional content besides text including graphics, animation, audio, video and other electronic data.

Also described above, electronic documents are typically displayed for a user with a software application called a "browser." A browser on a hand-held device may be a sub-set of a larger browser, and not capable of displaying complete content of a requested electronic document as stored on an electronic document server. A browser typically reads an electronic document and renders the electronic document content into a visual display of text, graphics, animation, audio, video, etc., for display on a device such as a personal computer. Most electronic documents developed assume that users will view the content of the electronic document with a browser on a desktop computer screen with a standard "SuperVGA" resolution (e.g., 800×600 pixel resolution with 256 or more available colors). A user can alter display of selected content by changing browser attributes. However, the custom content for a user is limited by changeable attributes in the browser being used.

Returning to FIG. 1, a proxy server 14 services requests for electronic documents from the first network device 12 and sends converted electronic documents back to the first network device 12. A content converter 16 converts content of an electronic document to a format usable on the first network device 12 (e.g., a device with a smaller display). A database 18 stores conversion preferences. FIG. 1 illustrates a single database 18. However, multiple database components can also be used. A computer network 20 provides one or more electronic document servers for supplying electronic documents.

In a preferred embodiment of the present invention, the computer network 20 is the World-Wide-Web on the Internet. As is known in the art, the Internet is a world-wide network of interconnected computers. The World-Wide-Web is an information system on the Internet designed for electronic document interchange. However, other computer networks with electronic document servers could also be used (e.g., an intranet). FIG. 1 illustrates the content converter 16 as an individual component. However, the content converter 16 can also be integral to the proxy server 14 (not illustrated in FIG. 1). A preferred embodiment of the present invention is not limited to the network components shown in the content conversion system 10 and more or fewer network components may also be used. In a preferred embodiment of the present invention, the proxy server 14 and the content converter 16 are software components. In addition, the functionality of components from FIG. 1 can also be provided with a combination of hardware and software components, or hardware components.

In a preferred embodiment of the present invention, the functionality of components from FIG. 1 is provided with software using object-oriented programming techniques and the C++ programming language. However, other object-oriented programming languages besides C++ could also be used. In addition, in a preferred embodiment of the present invention, the functionality of components of FIG. 1 can also be provided with non-object oriented programming languages (e.g., C programming language).

As is known in the art, object-oriented programming is used to design computer software including object-oriented objects that are easy to create, cost effective to modify, and reusable. Object-oriented objects include "object data" and "object services." Object services are provided through "object methods" (also called "object operations" or "object functions"). Object methods typically operate on private data such as "instance data" or "object state data" that an object owns. A collection of objects is called an "object class" which is sometimes called an "object type." An object class acts as a template that describes the behavior of sets of objects. An object's implementation is typically encapsulated, and is hidden from public view. Object private instance data can only be accessed by object methods of an object class. Object public instance data is accessed through a public "object interface."

An operating environment for components of content conversion system 10 of a preferred embodiment the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed." Although described with one CPU, alternatively multiple CPUs may be used for a preferred embodiment of the present invention.

The memory system may include main memory and secondary storage. The main memory is high-speed random access memory ("RAM"). Main memory can include any additional or alternative high-speed memory device or memory circuitry. Secondary storage takes the form of persistent long term storage, such as Read Only Memory ("ROM"), optical or magnetic disks, organic memory or any other volatile or non-volatile mass storage system. Those skilled in the art will recognize that the memory system can comprise a variety and/or combination of alternative components.

Acts and symbolically represented operations include the manipulation of electrical signals by the CPU. The electrical signals cause transformation of data bits. The maintenance of data bits at memory locations in a memory system thereby reconfigures or otherwise alters the CPU's operation. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile or non-volatile mass storage system readable by the CPU. The computer readable medium includes cooperating or interconnected computer readable medium, which exist exclusively on the processing system or may be distributed among multiple interconnected processing systems that may be local or remote to the processing system.

Components of content conversion system 10 allow content conversion based on one or more sets of conversion preferences. An electronic document converted by the content conversion system 10 is suitable for display on a device with a smaller display and less than SuperVGA resolution or on a display with SuperVGA resolution.

Content Conversion

Figure 2:
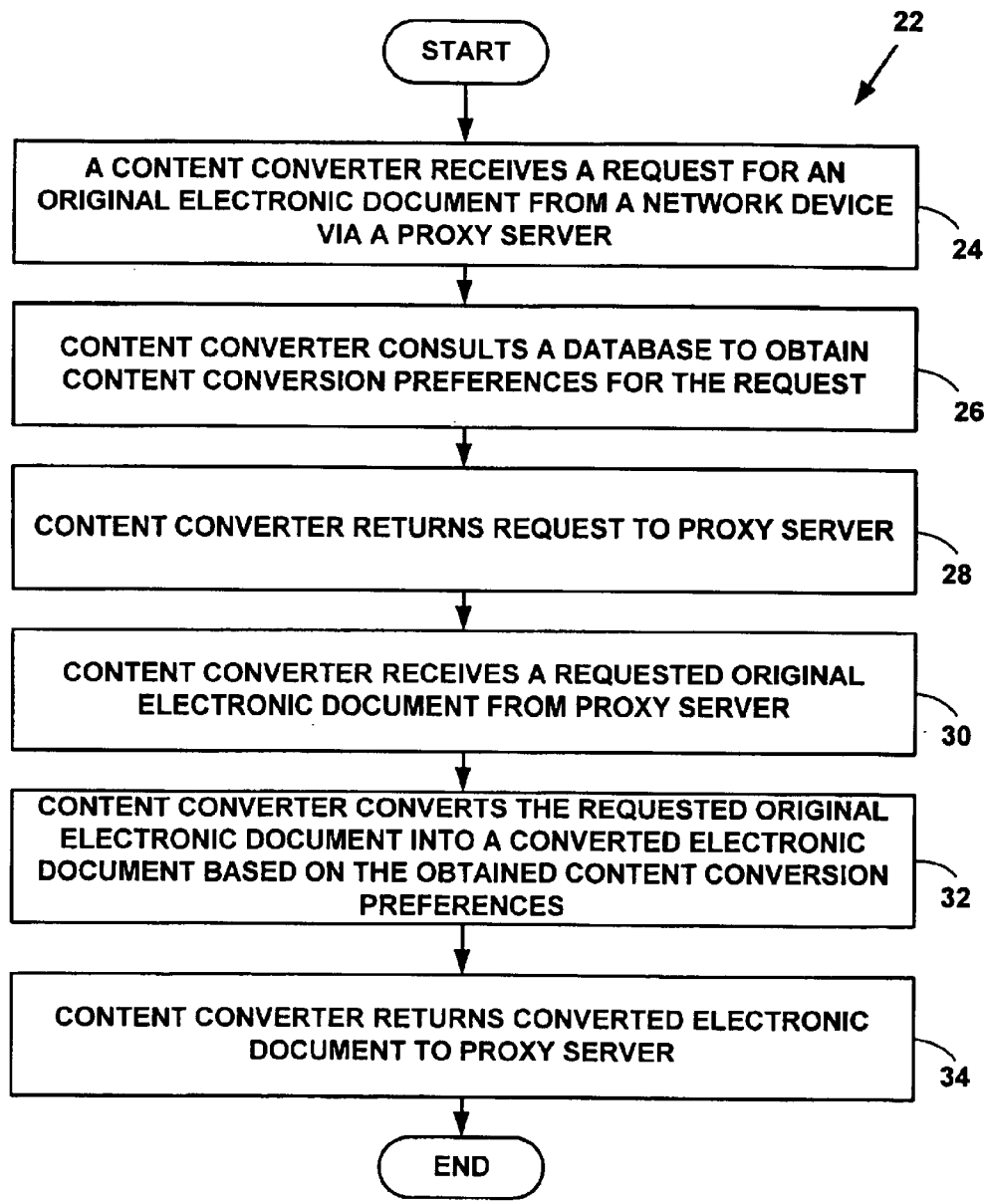
FIG. 2 is a block diagram illustrating a method for content conversion.

FIG. 2 is flow diagram illustrating a Method 22 for content conversion. At Step 24, the content converter 16 receives a request for an original electronic document from the first network device 12 via the proxy server 14. At Step 26, the content converter 16 consults the database 18 to obtain conversion preferences (e.g., conversion preferences to convert the original electronic document requested by the first network device 12 into a converted electronic document for the first network device 12). The conversion preferences can include any of user-preferences, device-conversion preferences, site-specific conversion preferences, or other preferences for content conversion. At Step 28, the content converter 16 returns the request for the original electronic document back to the proxy server 14. The proxy server 14 sends the request to an appropriate electronic document server on the computer network 20 to obtain the requested original electronic document.

At Step 30, the content converter 16 receives the requested original electronic document from the proxy server 14. At Step 32, content converter 16 converts the original requested electronic document into a converted electronic document based on conversion preferences (e.g., using a conversion directive or content conversion script) obtained at Step 26. Text, images and other hypertext content (e.g., audio, video, etc.) are converted based on one or more sets of preferences. At Step 34, the content converter 16 sends a converted electronic document to the proxy server 14. The proxy server 14 sends the converted electronic document to the first network device 12 in response to the request made by the first network device 12 for the original electronic document. The first network device 12 receives a converted electronic document based on one or more conversion preferences. Method 22 can also be practiced with the content converter 16 integral to the proxy server 14.

Method 22 allows a network device to receive a converted electronic document based on user-conversion preferences, device-conversion preferences, site-specific conversion preferences, or other preferences. Method 22 allows a personal digital assistant, hand-held computer, wireless phone, or other small or hand-held devices to receive a converted electronic document. The converted electronic document is appropriate for viewing on a smaller display with a lower resolution even though the original electronic document retrieved was written for a display in a higher resolution SuperVGA format. Method 22 can also be used for providing a converted electronic document for a display with SuperVGA resolution (e.g., by changing display characteristics based on one or more sets of conversion preferences).

Exemplary Content Conversion System

In one exemplary preferred embodiment of the present invention, the functionality of one or more components of the content conversion system 10 is split into multiple component modules and may include additional optional component modules (e.g., administrative modules, filter modules). Such an exemplary preferred embodiment is used to distribute functionality and provide additional conversion functionality to the content conversion system 10.

FIG. 3 is a block diagram illustrating an exemplary content conversion system 36 for one preferred embodiment of the present invention. However, the invention is not limited to the components illustrated in FIG. 3, and more or fewer components could also be used in the exemplary content conversion system. The original components of the content conversion system 10 from FIG. 1 are illustrated with a dashed line in FIG. 3. The original connections from FIG. 1 are not illustrated in FIG. 3. In addition, the conversion components could be split into more component modules or combined into fewer component modules.

An optional administrative interface 38 is used by system administrators with a second network device 40 to configure the conversion system 36 and to maintain the database 18. An optional administrative server 42 is a server used to modify configuration files used by the proxy server 14 and the database 18. A transaction manager 44 queries the database 18 for user-conversion preferences, device-preferences, site-specific conversion preferences, and other preferences during a request transaction.

A converter 46 communicates with client components 48, the content converter 16, and a cache 50, depending on the content type of an electronic document being converted. The converter 46 may also include a document production module (not illustrated in FIG. 3). The document production module can be use to help the converter 46 convert an electronic document comprising a metadata object and a datapipe object into a converted electronic document.

The client components 48 include network components that retrieve electronic document content from the computer network 20. The cache 50 stores Uniform Resource Locators ("URLs"), request headers, response headers, converted data, unconverted data, and/or a conversion signature for request transactions. As is known in the art, a URL is used to locate an electronic document on the World-Wide-Web. Content conversion functionality provided by the proxy server 14 and the content converter 16 (FIG. 1) is distributed among additional component modules in the content conversion system 36 (FIG. 3). However, a preferred embodiment of the present invention can be practiced without distributing conversion functionality among the multiple modules illustrated in FIG. 3.

In a preferred embodiment of the present invention, the functionality of component modules from FIG. 3 are implemented with software using object-oriented programming techniques and the C++ programming language. However, other object-oriented programming languages and other non-object oriented programming languages could also be used. In addition, functionality of component modules from FIG. 3 can also be implemented as a combination of hardware and software components, or as hardware components.

Exemplary Content Conversion

Figure 4B:
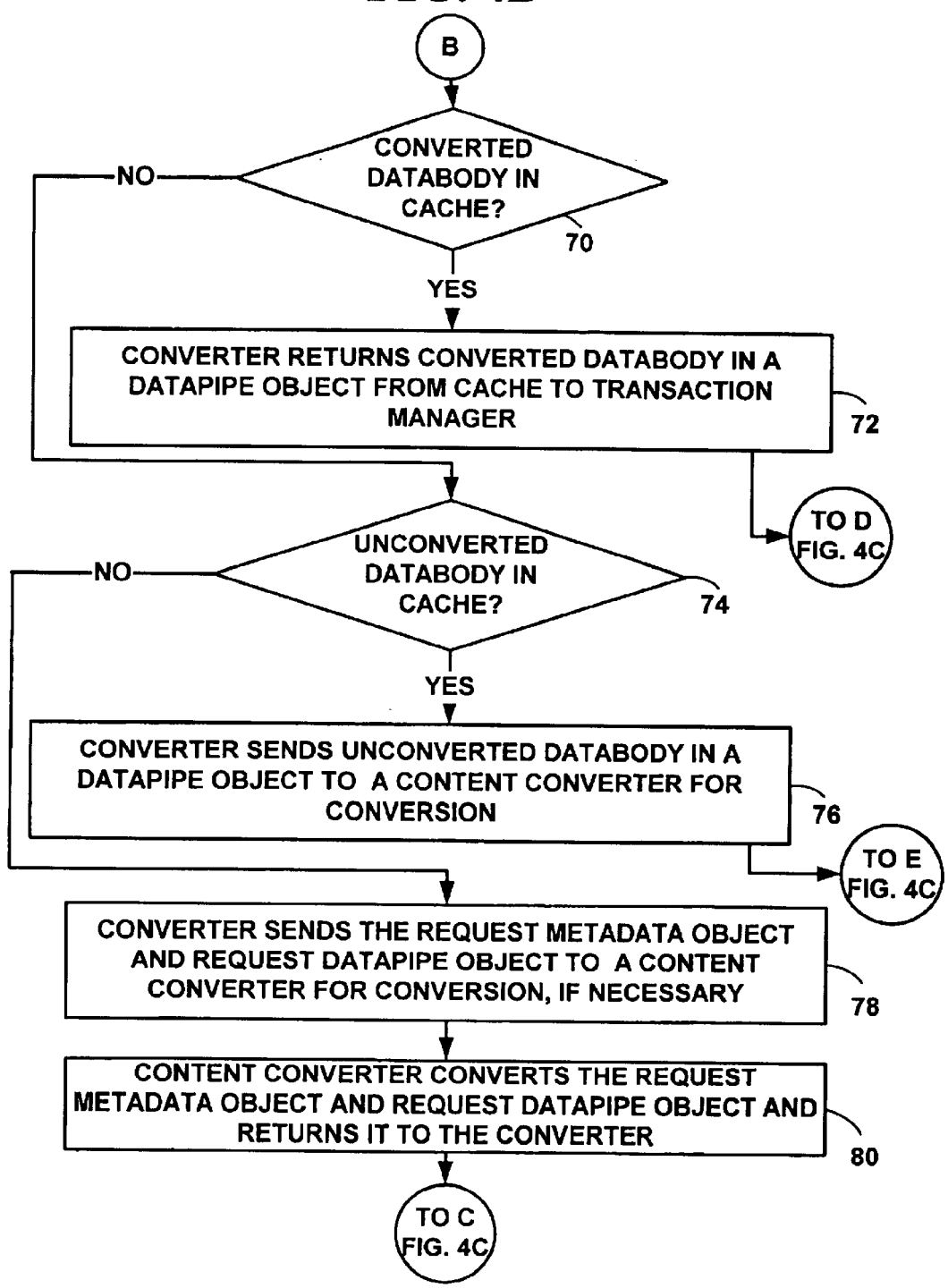

FIGS. 4A, 4B and 4C are a flow diagram illustrating an exemplary Method 52 for content conversion using the content conversion system 36 of FIG. 3. At Step 54 of FIG. 4A, the proxy server 14 receives a request from the first network device 12 for an original electronic document. In one exemplary embodiment of the present invention, the request is a Hyper Text Transfer Protocol ("HTTP") request (e.g., http://www.spyglass.com/info.html). However, other requests may also be made (e.g., File Transfer Protocol ("FTP") request, Gopher request, etc.) (e.g., ftp://www.spyglass.com/info.html). As is known in the art, HTTP is a transfer protocol used to transfer data from an electronic document server on the World-Wide-Web. For more information on HTTP see Internet Engineering Task Force ("IETF") Request For Comments ("RFC") 2068, incorporated herein by reference. File Transfer Protocol is a protocol that provides a way to access files on remote systems and is defined in RFC-172, incorporated herein by reference. Gopher is a protocol similar to File Transfer Protocol and provides a series of menus linked to files containing actual hypertext.

Returning to FIG. 4A at Step 56, the proxy server 14 which logs the request in a request log. At Step 58, a test is conducted by the proxy server 14 to determine if the first network device 12 is allowed to use content conversion functionality without login information. In a preferred embodiment of the present invention, the proxy server 14 uses network addresses (e.g., Internet Protocol ("IP")) addresses) for the test at Step 58. As is known in the art, IP is an addressing protocol designed to route traffic within a network or between networks. IP is described in RFC-791, incorporated herein by reference. However, other tests could also be used to determine if a network device is allowed to use content conversion without login information.

If a network device is not allowed to use content conversion without login information, at Step 60 the proxy server 14 prompts the first network device 12 for login information and logs a network address (e.g., IP address) for the first network device 12. If the first network device 12 is allowed to use content conversion functionality without login information at Step 58, or login information was obtained at Step 60, at Step 62 the proxy server 14 creates a object-oriented data structure called a "metadata" object and a "datapipe" object.

In an exemplary preferred embodiment of the present invention, a metadata object is a C++ object that conveys information such as request/response headers, conversion preferences and other information about a "databody" stored in a datapipe object. The datapipe object is also a C++ object. However, metadata objects and datapipe objects other than C++ objects could also be used. A databody is electronic document content such as hypertext markup languages (e.g., SGML, HTML, XML, VRML, etc.), text, graphical data, or graphics, animation, audio, video or other content that is stored in a datapipe object.

Table 1 illustrates an exemplary metadata object-oriented interface for a metadata object and an exemplary data structure for the metadata object. In an exemplary preferred embodiment of the present invention, object interfaces are Common Object Request Broker Architecture ("CORBA") interfaces. As is known in the art, CORBA is an architecture for creating, distributing and managing distributed program objects. However, other object architectures could also be used (e.g., Component Object Model ("COM") or Distributed Component Object Model ("DCOM") interfaces). Other object-oriented data structures could also be used and the present invention is not limited to the metadata object data structure illustrated in Table 1.

TABLE 1

```
© by Spyglass, Inc.
// CORBA object interface for metadata object
typedef sequence<octect> CCMDSEQ;
interface CCMetaData
{
    void set (in string Category, in string Name, in string Value) //creates a new CCMetaData record
        raises (MDException); //error message in case of error
```

TABLE 1-continued

```
    void replace(in string Category, in string Name, in string Value) //replaces a value of a specified
        raises (MDException);                                    // CCMetaData record
    void get(in string Category, in string Name, out string Value) //Gets a value of 1st occurrence of a
        raises (MDException);                                    // specified CCMetaDataRecord
    boolean exists(in string Category, in string Name)//Checks if a specified record exists
    void del (in string Category, in string Name) //Deletes 1st occurrence of a CCMetaData record
        raises (MDException);
    void getByRank(out string Category, in string Name, out string Value)//Gets a value of 1st occurrence
        raises (MDException);                                    //of a CCMetaData record
    void resetRank( ); //clears category rank settings and frees associated memory
        raises (MDException);
    void appendRank(in string Category)//Adds a specified request category to end of a rank list
        raises (MDException); //The 1st category appended has highest rank
    void signset(in string Category, in string Name, in string Value)//Adds a specified record to a
        raises (MDException); //conversion signature data object
    boolean SignatureValidate( ) //validate cache hits for a conversion signature
        raises (MDException);
    void serializedRequestMD(out CCMDSEQ serializedConvertedMD)//reserved for future use
        raises (MDException);
    void serializedSignatureMD(out CCMDSEQ SerializedSignatureMD)//reserved for future use
        raises (MDException);
    void debugRequestMD(in string FileName)//Outputs request-related metadata records
        raises (MDException);
    void debugResponseMD(in string FileName)//(Outputs response-related metadata records
        raises (MDException);
    void debugSignatureMD(in string FileName)/Outputs signature-related metadata records
        raises (MDException);
    void impl_release( ); //release a ccmetadata record
    void impl_duplicate( ); //duplicate a ccmetadata record
};
```

Table 2 illustrates an exemplary object-oriented interface for a databody and an exemplary data structure for the databody. However, other object interfaces and data structures could also be used and the present invention is not limited to the databody interface and data structures illustrated in Table 2.

TABLE 2

```
© by Spyglass, Inc.
//CORBA object interface for databody
typedef sequence <octect> CCDATASEQ;
interface CCOpData
{
        void impl_release( );
        void impl_duplicate( );
};
interface CCOpDataRaw:CCOpData
{
    attribute string name; // name of the object
    attribute string type; // type of the object
    attribute CCDATASEQ data; //CORBA sequence data for databody
    (e.g., hypertext)
};
//databody data structure
typedef struct_DATABODY
{
        char*pData;          /* Pointer to data */
        size_t nSize;        /* Size of body buffer */
        size_t nUsed;        /* Bytes in use */
        size_t nMinGrow;     /* Minimum growth size */
}DATABODY;
```

Returning to FIG. 4A at Step 62, the proxy server 14 also creates a "datapipe" object-oriented object. The datapipe is an object-oriented object that can be read by multiple readers, but written to by only one writer. In one preferred embodiment of the present invention, the datapipe object holds a databody including electronic document content.

Table 3 illustrates an exemplary object-oriented datapipe interface. However, other object interfaces could also be used and the present invention is not limited to the datapipe object illustrated in Table 3.

TABLE 3

```
© by Spyglass, Inc.
// Datapipe buffer
typedef sequence<octet> dpBuf;
// Datapipe reader interface
// Not thread safe
//    Threads should not share a reader, but have their own readers
interface dpReader
{
    // Release datapipe reader implementation
    void impl_release( ):
    // Read from datapipe asynchronously
    // Returns immediately with octets currently available up to sizeDesired
    // Returns TRUE until EOF read
    // Caller must free returned dpBuf
    // dpBuf only valid while datapipe or dpReader reference held by caller
    boolean readAsync(out dpBuf output, in unsigned long sizeDesired)
        raises(dpError);
    // Read from datapipe synchronously
    // Blocks until sizeDesired octets read, EOF read, or abort signaled
    // Returns TRUE until EOF read
    // Caller must free returned dpBuf
    // dpBuf only valid while datapipe or dpReader reference held by caller
    boolean read(out dpBuf output, in unsigned long sizeDesired)
        raises(dpError);
    // Read entire datapipe synchronously
    // Blocks until all data available (EOF read), or abort signaled
    // Caller must free returned dpBuf
    // dpBuf only valid while datapipe or dpReader reference held by caller
    dpBuf readAll( )
        raises(dpError);
    // Seek reader to new absolute file position
    // Returns immediately
    // Callers can seek to a desire file position before data is available
    // Seeking past the EOF will cause an exception to be thrown on reading
    void seekAbs(in unsigned long filePos);
    // Seek reader to new relative file position
    // Returns immediately
    //    Returns new file position
    // Callers can seek to a desire file position before data is available
    // Seeking past the EOF will cause an exception to be thrown on reading
    unsigned long seekRel(in long offset);
};
```

TABLE 3-continued

```
// Datapipe interface
interface datapipe
{
  // Duplicate datapipe
  // Increments implementation reference count
  void impl_duplicate( );
  // Release reference to datapipe
  // Decrements implementation reference count
  // The datapipe will be destroyed when the reference count reaches 0
  void impl_release( );
  // Create a datapipe reader
  // File position = 0
  dpReader createReader( )
  raises(dpError);
  // Write input data to the end of the datapipe
  // Data written is immediately available to all readers
  void write(in dpBuf input)
  raises(dpError);
  // Write end of file to datapipe
  // Releases any unused datapipe memory
  // All subsequent write operations will generate an exception
  void terminate( );
  // Set abort signal on datapipe
  // All subsequent read/write operations will generate an exception
  void abort( );
  // Get bytes available for reading in datapipe
  unsigned long getAvailable( );
  // Set datapipe size
  // Changes the size of pipe after creation
  // Intended for use when pipe initially sized to 0
  //    Note: will not size the pipe smaller than existing used size
  //       does not affect file position
  void setSize(in unsigned long newSize)
  raises(dpError);
};
// Datapipe factory interface
interface dpFactory
{
  // Create a new datapipe object
  // Initial implementation reference count = 1
  // Specifying a minGrow of 0 causes the datapipe size to double for
    each grow datapipe create(in unsigned long initialSize,
    in unsigned long minGrow)
  raises(dpError);
};
interface CCOpDataPipe:CCOpData
{
  attribute string    name;
  attribute datapipe  pipe;
};
```

After creating the conversion objects, the proxy server 14 passes request/response data objects. For example, the proxy server 14 passes the request including the metadata object and the datapipe object to the transaction manager 44.

At Step 64, the transaction manager 44 adds user, device, site-specific, or other conversion preferences from the database 18 to the request metadata object. In a preferred embodiment of the present invention, the transaction manager 44 uses transfer protocol request headers to identify devices and an IP address and a user-name to identify a user. However, other identification methods could also be used. The transfer protocol request headers may include HTTP headers or Multipurpose Internet Mail Extension ("MIME") headers defined in RFC-2046, incorporated herein by reference.

At Step 66, the transaction manger 46 passes the request metadata object and datapipe object to the converter 46. At Step 68, the converter 46 creates a one or more conversion keys derived from the metadata object including user and device-identifiers and a site-identifier using a request URL. A first conversion key is used to query the cache 50 for a converted or unconverted databody that will satisfy the request. However, other information could also be used to create the conversion key. A second conversion key is used to obtain conversion preferences from the database 18.

In a preferred embodiment of the present invention, the first and second conversion keys do not include the same information. The first conversion key used to query the cache 50 includes a URL plus additional information from the metadata object. The second conversion key used to query the database 18 may include a user-agent name, a user-name, or a URL may be used to query a database other than database 18.

At Step 70 of FIG. 4B, a test is conducted by the converter 46 to determine if a "suitable" version of a converted databody for the request is already in the cache 50. In a preferred embodiment of the present invention, a suitable version of a converted databody is one that is not older than a predetermined date or time. However, other criteria could also be used to determine a suitable converted databody (e.g., criteria included in a conversion signature). If a suitable version of a converted databody exists in the cache 50, the converter 46 sends a datapipe object including the converted databody from the cache 50 to the transaction manager 44 at Step 72. If a suitable converted version of a databody for the request is not already in the cache 50 at Step 72, a test is conducted at Step 74 to determine if an original unconverted databody is already stored in the cache 50. If so, at Step 76 converter 46 sends a datapipe object including the unconverted databody from the cache 50 to the content converter 16 for conversion.

If an original unconverted databody is not stored in the cache 50 at Step 74, (i.e., the cache 50 does not contain any databody matching the request), the converter 46 sends the metadata object and datapipe object associated with the request to the content converter 16 at Step 78. The content converter 16 converts the request metadata object and datapipe object if necessary, and returns it to the converter 46 at Step 80.

At Step 82 of FIG. 4C, the converter 46 invokes the client components 48 to send the request to a desired electronic document server on the computer network 20 (e.g., World-Wide-Web server on the Internet). At Step 84, the desired electronic document server on the computer network 20 returns an original electronic document to the converter 46 that is converted into a response databody in a response datapipe object and a response metatdata object (e.g., including response headers) by the client components 48.

At Step 86, the converter 46 saves the response databody as raw data and response metadata object including response headers in the cache 50. Storing an unconverted response in the cache 50 may save transmission time when a network device makes a second request for an original electronic document, but with new conversion preferences. The unconverted response can then be used to create a converted response with new conversion preferences without contacting an electronic document again on the computer network 20.

At Step 88, the converter 46 sends the response databody stored in the response datapipe object to the content converter 16 for conversion. At Step 90, the content converter 16 performs any necessary conversions on the response metadata object and response databody in the response datapipe object and returns a converted response to the converter 46. At Step 92, the converter 46 sends a converted response including a converted databody in a datapipe object and a converted response metadata object to the cache 50 and to the transaction manager 44. Storing a converted response in the cache 50 saves processing time when a network device makes a second request for the same original electronic document with the same conversion preferences. A converted response can be returned without contacting an electronic document server again on the computer network 20.

At Step 94, the transaction manager 44 sends the converted response to the proxy server 14. At Step 96, the proxy server 14 sends the converted response to the first network device 12 via the user agent 38.

Exemplary Method 52 (FIG. 4) illustrates content conversion using the content conversion system 36 from FIG. 3. However, more or fewer steps can also be used with exemplary Method 52 and different content conversion system components could also be used. The exemplary preferred embodiment of the present invention is not limited to exemplary Method 52 or the content conversion system 36.

Exemplary Content Converter

Figure 5:
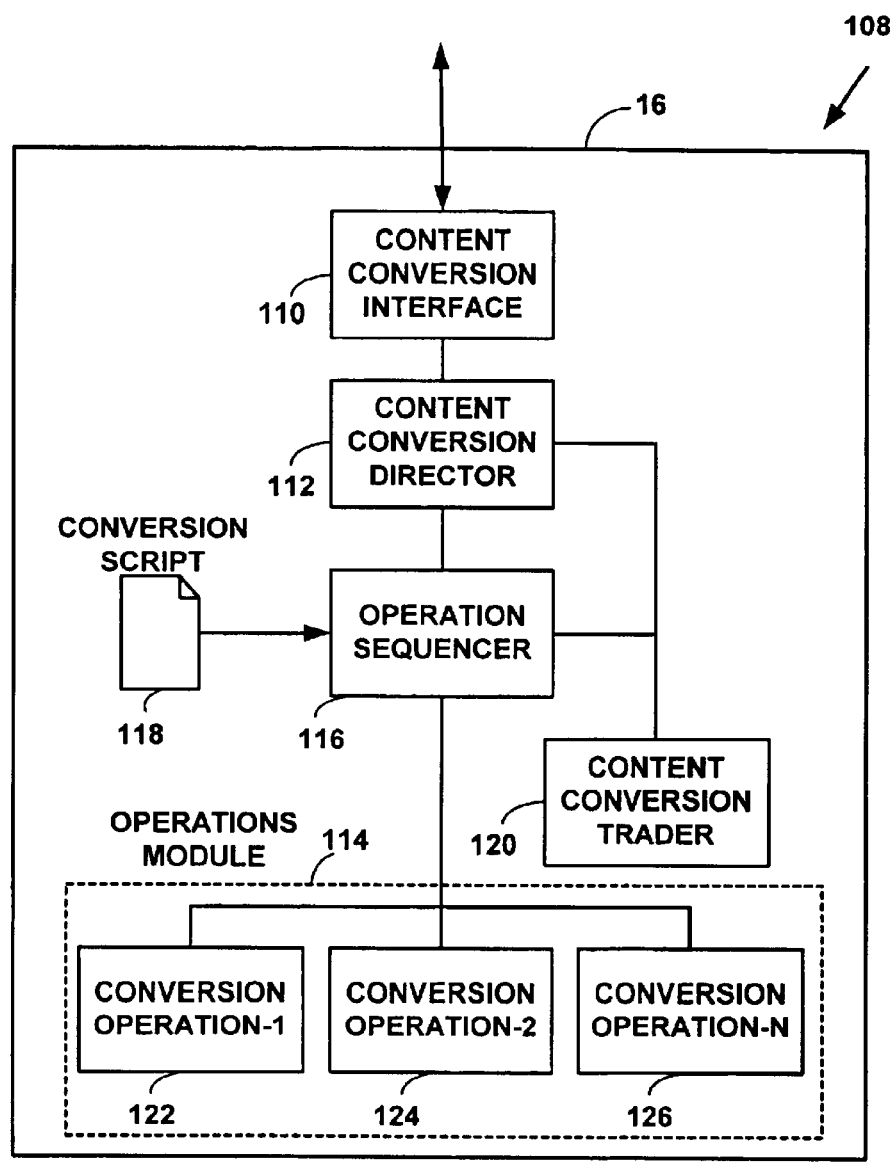
FIG. 5 is a block diagram illustrating components of a content converter.

In one exemplary preferred embodiment of the present invention, the content converter 16 is split into multiple component modules. FIG. 5 is a block diagram illustrating multiple components 108 of content converter 16. Content converter 16 includes a content conversion interface 110, a content conversion director 112, an operations module 114, an operation sequencer 116, a conversion script 118, a content conversion trader 120 and multiple conversion operations 122, 124, 126, three of which are illustrated. However, the content converter 16 can also be split into more or fewer component modules, and the exemplary preferred embodiment of the content converter 16 is not limited to the components illustrated in FIG. 5.

Content conversion interface 110 provides an interface between the content converter 16 and other components from the content conversion system 36 or the content conversion system 10. The content conversion director 112 directs content conversions. The operations module 114 is a library (e.g., a Dynamic Link Library) of functions that includes conversion operations. The operation sequencer 116 controls conversion operations including those listed in a conversion script 118. The conversion script 118 is a file that specifies which conversion operations should be executed for a selected content types (but not all content types) and in what order. The conversion script 118 includes a conversion directive. The content conversion trader 120 is a data reference registry for available conversion operations. A first conversion operation can locate a second conversion operation by importing an object reference from the content conversion trader 120. The content conversion operations 122, 124, 126 include multiple conversion operations and reside in the operations module 114.

Tables 4 and 5 illustrate exemplary content conversion operations for the content conversion operators 122, 124, 126. However, more or fewer content conversion operations or conversions for other content types (e.g., VRML) could also be used. For example, another set of conversion operations may be used to convert HTML to an audio format (e.g., a wave format "*.WAV"), or convert an audio format to HTML).

Table 4 illustrates exemplary HTML conversion operations. However, more or fewer HTML conversion operations could also be used, and the conversion operations can also include other hypertext conversion operations (e.g., XML, SGML, VRML, etc.).

TABLE 4

| HTML Conversion Operation | Description |
| --- | --- |
| DOM_CREATE | Creates a Document Object Model ("DOM") from an HTML document.. |
| DOM_EVAL | Evaluates one or more expressions that select one or more hypertext elements from a DOM. |
| DOM_TEMPLATE | Creates a new HTML document by inserting hypertext elements (e.g., selected by DOM_EVAL) into an HTML template. |
| DOM_IMPORT | Import hypertext elements from other hypertext documents. |
| HTML_ATTRIBUTE_ADD | Adds a specified attribute and value to instances of a specified tag. |
| HTML_ATTRIBUTE_MAX | Changes a value of a specified attribute to a maximum value in instances of a specified tag. |
| HTML_ATTRIBUTE_MIN | Changes a value of a specified attribute to a minimum value in instances of a specified tag. |
| HTML_ATTRIBUTE_REMOVE | Removes a specified attribute from instances of specified tag. |
| HTML_ATTRIBUTE_REPLACE | Replaces a value for instances of a specified tag. |
| HTML_ATTRIBUTE_SCALE | Scales a value for instances of a specified tag. |
| HTML_COMMENT_REMOVE | Remove comments from an HTML document. |
| HTML_ELEMENT_REMOVE | Removes instances of a specified HTML tag element. |
| HTML_IMAGE_ATTR_SCALE | Scales width and height attributes of instances of an HTML IMG tag. |
| HTML_IMAGE_TO_LINK | Removes an image from an HTML document and creates a link to the image. |
| HTML_IMAGEMAP_SCALE | Scales instances of HTML image maps. |
| HTML_SCALE_IMAGE_QUALITY | Scales an image to reduce its data size without changing the size of the image presented in an HTML document. |
| HTML_TABLE_TRANSLATE | Removes instances of table tags and reformats the contents of tables. |
| HTML_TAG_REMOVE | Removes instances of a specified tag. |
| HMTL_TAG_REPLACE | Replaces instances of a specified tag with a new tag. |

Table 5 illustrates exemplary image conversion operations. However, more or fewer image conversion operations could also be used, and the conversion operations can also include other image conversion operations. The content converter 16 uses exemplary image conversion operators to convert images into an internal "raw image" format. The internal raw image format is used to quickly reduce and scale images, as well as convert one image format into another image format. However, the present invention is not limited to using a raw image format and other internal image formats could also be used.

TABLE 5

| Image Conversion Operation | Description |
| --- | --- |
| PI_REDUCE | Reduce an image to a specified color depth. |
| PI_SCALE | Scale an image. |
| PI_CONVERT_TO_GRAY | Convert a color image to a gray scale image. |
| BMP_TO_PI | Convert a Bit-MaPed ("BMP") image format to a raw image format. |
| JPEG_TO_PI | Convert a Joint Pictures Expert Group ("JPEG") image format to a raw image format. |
| PI_TO_BMP | Convert a raw image format to a BMP image format. |
| PI_TO_JPEG | Convert a raw image format to a JPEG image format. |

FIG. 6 is a flow diagram illustrating a Method 128 for content conversion with the content converter 16 multiple components 108 illustrated in FIG. 5. At Step 130, the content converter 16 receives a conversion request from the converter 46 (e.g., Step 88 of FIG. 4C) or from the proxy server 14 (e.g., at Step 30 of FIG. 2) at the content conversion interface 110. At Step 132, the content conversion interface 110 supplies an object-oriented interface to a request metadata object and a request datapipe object including a databody that interact with other objects including the conversion operations 122, 124, 126. In a preferred embodiment of the present invention, the object interface is a CORBA interface called an "Interface Design Language" interface. However, other object interfaces could also be used (e.g., Component Object Model ("COM") or Distributed Component Object Model ("DCOM") interfaces). Table 6 illustrates an exemplary content conversion interface supplied by the content conversion interface 110.

TABLE 6

© by Spyglass, Inc.
//Content Conversion Interface - Interface Design Language
interface ("IDL")
module ContConv {
// Operation exception reason codes
enum opReason
{
  OP_FAILED,     // Operation failed.
  OP_MEMERR,    // Out of virtual memory.
  BAD_DATA,      // CCOpData was wrong type, or had bad data.
  BAD_METADATA, // CCMetaData contained missing or bad data.
  BAD_ARG       // Argument string was incomplete or
                       bad format.
};
// Operation exception
exception opError
{
  opReason  reason;   // Reason code
  string    message;  // Descriptive message.
};
interface CCOperation
{
    void Do(inout CCOpData data,
             inout CCMetaDataNS::CCMetaData metadata,
             in string arg) raises (opError);
    void Restart( );
};
};

After supplying the object interface content conversion interface, the content conversion interface 110 sends the conversion request to the content conversion director 112.

At Step 134, the content conversion director 112 calls the operation sequencer 116. In another embodiment of the present invention, a starting conversion component can also be specified in the request metadata object. By default, the operation sequencer 116 is the conversion component called to handle the conversion request. However, other content converter 16 components 108 can also be used. At Step 136, the operation sequencer 116 reads the request metadata object and creates one or more conversion keys to determine a list of conversion operations that need to be called and a sequence order in which the conversion operations should be executed. In one preferred embodiment of the present invention, the list is a "conversion directive" with a "conversion precedence." In another embodiment of the present invention the conversion directive is stored in the conversion script 118. The list and sequences can also be obtained from information in the database 18.

In a sequence beginning at Step 138, for operations in the list of conversion operations, the operation sequencer 116 obtains an object address of a selected conversion operation (e.g., 122, 124, 126) from the content conversion trader 120. At Step 140, the selected conversion operation is executed. The executed conversion operation modifies the request databody stored in a datapipe object and request metadata object, if necessary and returns control to the object sequencer 116. The sequence including Steps 138 and 140 is repeated until all conversions desired by the conversion request are completed when control is returned to the content conversion director 112.

Table 7 illustrates exemplary source code to obtain an address for an object-oriented conversion method from the content conversion trader 120 and illustrates a generic object-oriented class for conversion operations. However, object-oriented methods code and other object-oriented classes could also be used. A name for a desired conversion operation is substituted for OpName in Table 7 (e.g., OpName=HTML_COMMENT_REMOVE, for removing comments from an HTML document).

TABLE 7

© by Spyglass, Inc.
// creates an instance of Content Conversion Trader 120 ("CCTrader")
CCTrader *pCCTrader = CCTrader::Instance( );
ContConv::CCOperation_var pOperation =
  PCCTrader->ImportOperation("operation_name"); //e.g., HTML_COMMENT_REMOVE
if(!CORBA::is_nil(pOperation))
  POperation->Do(data, metadata, arg);
//generic object-oriented class for a conversion operation
class OpName:public CCOperationIPL // e.g., class HMTL_COMMENT_REMOVE
(
  public:
    OpName(const char *OpName = "Internal_OpName"); //e.g., *OpName="spyga-comment-remove"
    Virtual ~OpName( ) {};
    Void Do(ContConv::CCOpData, *&data, CCMetaDataNS::CCMetaData *&metadata,
      Const char *arg);
};

At Step 142, the content conversion director 112 sends a converted metadata object and a converted databody in a datapipe object to the content conversion interface 110. At Step 144, content conversion interface returns the converted metadata object and converted databody in the datapipe object to the converter 46 (e.g., Step 90, FIG. 4C) or to the proxy server 14 (e.g., Step 34 of FIG. 2).

FIG. 5 and FIG. 6 illustrate one exemplary preferred embodiment of the present invention for content conversion in which the content converter 16 has been split into multiple components 108. However, this one exemplary preferred embodiment of the present invention is not limited to the multiple components illustrated in FIG. 5 or the steps illustrated with Method 128 of FIG. 6 and more or fewer conversion steps could also be used. In addition, the multiple content converter 16 components 108 of FIG. 5 can also be used for content converter 16 in content conversion system 10 illustrated in FIG. 1, or content conversion system illustrated in FIG. 3.

Content Conversion Using Conversion Preferences

In a preferred embodiment of the present invention, content conversion of an original electronic document is based on one or more conversion preferences. The conversion preferences are organized into multiple categories including user-conversion preferences, device-conversion preferences or site-specific conversion preferences or other conversion preferences. However, more or fewer conversion preferences could also be used.

After a network device with a smaller display requests an electronic document, the content converter 16 uses one or more sets of conversion preferences to determine how to convert the original electronic document into a converted electronic document usable by the network device.

FIG. 7 is a block diagram illustrating a Method 146 for content conversion using conversion preferences. At Step 148, content converter 16 receives a request for an original electronic document from the first network device, 12 (e.g., via the proxy server 14 FIG. 1). The request includes a request metadata object with request headers (e.g., HTTP headers or MIME headers and IP headers), a request URL and other information and a datapipe object. At Step 150, conversion information is extracted from the request. In one exemplary preferred embodiment of the present invention, a user-identifier, a device-identifier, and a site-identifier based on a request URL are extracted from the request. However, other information and identifiers could also be extracted. In such an embodiment, transfer protocol headers from the request headers (e.g., HTTP headers or MIME headers) are used to identify a device-type and to identify a request URL. An IP address from a request header is used to identify a user location from the first network device 12 making the request. However, other information could also be used to identify a user, a device, or a site.

At Step 152, content converter 16 creates one or more conversion keys from the extracted conversion information to access one or more conversion preferences stored in the database 18. In one exemplary preferred embodiment of the present invention multiple conversion keys are created from a user-identifier, a device-identifier and site-identifier based on a request URL. However, other conversions keys could also be created (e.g., a user-identifier and device-identifier, a user-identifier and a site-identifier, or device-identifier and a site-identifier, etc.). In addition, access to the one or more conversion preferences could also be from a source other than the database 18 (e.g., obtained from another server on another network or from another network device).

At Step 154, the conversion key to is used to obtain one or more conversion preferences for the request. In one exemplary preferred embodiment or the present invention user, device and site-specific (i.e., a URL) conversion preferences are obtained. However, more or fewer preferences could also be obtained. At Step 156, a conversion directive is created with conversion precedence from the obtained conversion preferences. In one preferred embodiment of the present invention, the conversion directive is stored in a metadata object. However, other conversion directive types and storage can also be used. The conversion directive is stored in persistent storage (e.g., the database 18, a user's hard drive, etc.) for later use. A number of different conversion directives can be created at Step 156, dependent on the conversion preferences being used including those from conversion script 118. Thus, a number of permutations are typically available to create a conversion directive since at least three types of conversion preferences are typically used (e.g., user, device and site-specific). Using more than three types of conversion preferences provides additional conversion permutations from which a conversion directive can be created.

The conversion directive based on selectable conversion preferences can be used to instruct the content converter 16 to convert an electronic document differently for different devices (e.g., a first device has a color display while a second device has a monochrome display; convert an electronic document differently for different users (e.g., a first user prefers to view images in a low resolution display mode, while another user desires to view images in a high resolution display mode); and convert an electronic document different for different sites (e.g., a first site may include electronic documents with a large number of images, while a second site may include only HTML documents with text and a few images. The first site may require a user's device set one or more viewing parameters to view the images to be displayed).

At Step 158, the content converter 16 applies the conversion directive to convert an electronic document retrieved from an electronic document server on the computer network 20. The conversion precedence in the conversion directive provides a precedence hierarchy for content conversion.

In one exemplary embodiment of the present invention, user-conversion preferences are at a highest level in the precedence hierarchy, followed by device-conversion preferences, followed by site-specific conversion preferences. If user-conversion preferences are available, then they are used before device-conversion preferences or site-specific conversion preferences based on the exemplary hierarchy. If no user-conversion preferences are available, device-conversion preferences are used before site-specific conversion preferences based on the exemplary hierarchy. In another embodiment of the present invention, the precedence hierarchy includes different preference precedence (e.g., site-specific conversion preferences may have a higher precedence than user-conversion preferences based on the characteristics of a network site). In one preferred embodiment of the present invention, a preference hierarchy is statically assigned by a system administrator and cannot be changed by a user. In another embodiment of the present invention, the preference hierarchy may be dynamically changed by a user.

In cases where there is a conversion preference conflict, the content converter 16 determines which preferences have priority. An HTML site may require that a user's device set display resolution to high resolution mode to allow images to be adequately displayed. A site-specific conversion preference is then provided by the HTML site to set display resolution to high resolution. However, a user may not like the high resolution mode to be used on the device, and provide a user-conversion preference for medium resolution mode. A conflict results, and the content converter 16 resolves the conflict. If user-conversion preferences have higher precedence, then the user-conversion preference (i.e., medium resolution) is used over the site-specific conversion preference. If site-specific conversion preferences have higher precedence, then the site-specific conversion preferences would be used over the user conversion preferences (i.e., high resolution).

As an example of the use of Method 146, the first network device 12, a Personal Digital Assistant ("PDA"), with an IP address of 128.10.20.30, requests a hypertext document with the URL "http://www.spyglass.com/info.html." Using Method 146, at Step 148 the content converter 16 receives a request for an original electronic document from the first network device 12 (e.g., via the proxy server 14 or the converter 46). The metadata object includes one or more request headers (e.g., HTTP or MIME) including an IP address of 128.10.20.30, a device-identifier of "PDA" and a URL component of "www.spyglass.com/info.html" and a datapipe object for a databody. At Step 150, conversion information is extracted from the request. A user-identifier of 128.10.20.30, a device-identifier of PDA and a site-identifier including request URL of "www.spyglass.com" is extracted from the request headers.

At Step 152, one or more conversion keys are created from the extracted information to access one or more conversion preferences stored in the database 18. In one exemplary preferred embodiment of the present invention, a first conversion key is created from the user-identifier 128.10.20.30 mapped to a user-name (e.g., "kenc"). A 20 second conversion key is created from a device-identifier of PDA. A third conversion key is created with a site-identifier request URL "www.spyglass.com." However, more or fewer conversion keys could also be created.

At Step 154, the one or more conversion keys are used to obtain one or more conversion preferences for the request from the database 18. Table 8 illustrates exemplary preferences extracted from the database 18 for the request.

TABLE 8

| Type of Conversion Preference | Preferences |
|---|---|
| User<br>ID = 128.10.20.30,kenc | Remove comments in hypertext documents.<br>Change a display font to "Arial" in hypertext documents. |
| Site-Specific<br>ID = www.spyglass.com | None. |
| Device<br>ID = PDA | Convert images to grayscale.<br>Scale images to 50% of original size. |

Table 8 lists exemplary conversion preferences stored in non-precedence order in the database 18 so conversion precedence must be determined (i.e., user-converson preferences have highest precedence, device-conversion preferences have next highest preferences and site-specific conversion preferences have lowest precedence). However, in another preferred embodiment of the present invention, conversion preferences are stored in precedence order.

At Step 156, a conversion directive is created with conversion precedence from the obtained conversion preferences. An exemplary conversion directive for the conversion preferences shown in Table 8 is illustrated in Table 9. There are no conflicts to resolve in this example.

TABLE 9

© by Spyglass, Inc.

spyga_remove_comments:yes
spyga_change_attribute:font=arial
spyga_convert_to_gray:yes
spyga_scale_image:scale=50%

Table 9 illustrates an exemplary conversion directive in precedence order. The user preferences are first (spyga_remove_comments, spyga_change_attribute:font= "arial"), followed by the device preferences (spyga_convert_to_gray:yes, spyga_scale_image:scale="50%), followed by site-specific conversion preferences (i.e., none). The user preference to remove comments is executed before the user preference to change the display font to "Arial."

The conversion directive (e.g., Table 8) created at Step 156 of FIG. 7 is applied to an exemplary original electronic document at Step 158. An exemplary original HTML hypertext document is illustrated in Table 10. However, a conversion directive including the exemplary conversion directive from Table 9 can also be applied to other hypertext document types (e.g., XML, SGML or VRML).

TABLE 10

<!Example.html>
<HTML>
<! This is an HTML comment>
<TITLE>Example</TITLE>
<BODY>
This is a conversion example.
<BR><!new line>
<! Display a sample image>
<IMG src="http://www.spyglass.com/glasses.jpg">
<BR>
This is a sample image.
</BODY>
</HMTL>

The first network device 12 requests the hypertext document called "example.html" illustrated in Table 10 from the World-Wide-Web site "www.spyglass.com. Table 11 illustrates an exemplary converted electronic document after application of Step 158 of Method 146 (FIG. 7). HTML comments have been removed from the HTML document in Table 10 based on the first user preference illustrated in Table 9 (i.e., remove_comments).

TABLE 11

<HTML>
<TITLE>Example</TITLE>
<FONT FACE="Arial">
<BODY>
This is a conversion example.
<BR>
<IMG src="http://www.spyglass.com/glasses.jpg">
<BR>
This is a sample image.
</BODY>
</HTML>

On line 3 of Table 11, the display font face has been changed to Arial with the HTML tag "<FONT FACE= "Arial">". Note that this tag does not exist in Table 10. The image in Table 11, "glasses.jpg," is converted by the content converter 16 when the image is requested using conversion preferences store in the database 18. The conversion of the image is "invisible" to the user.

Figure 8A:
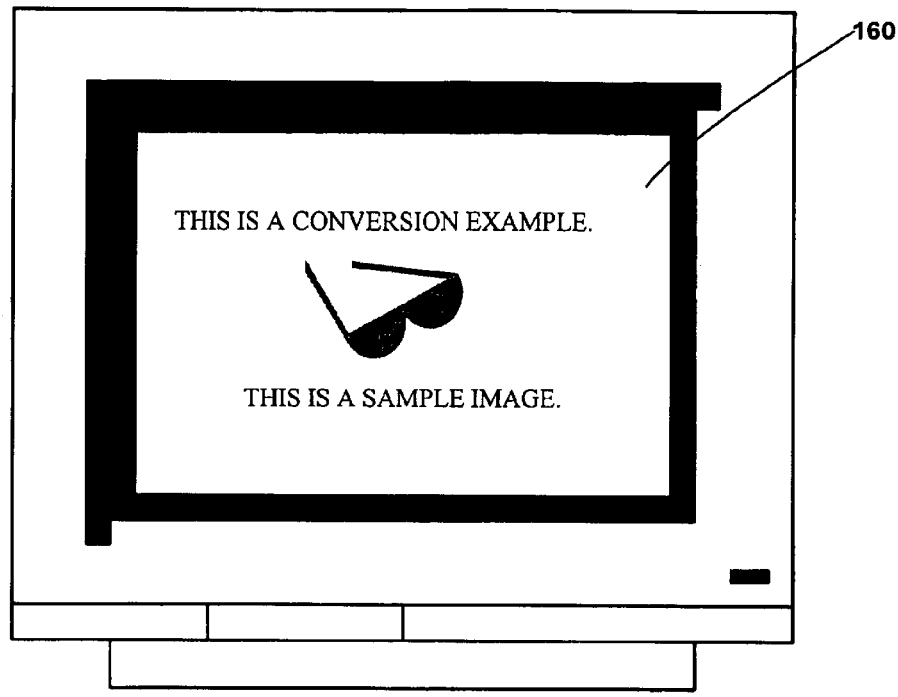
FIGS. 8A and 8B are block diagrams illustrating exemplary content conversion screen displays.
Figure 8B:
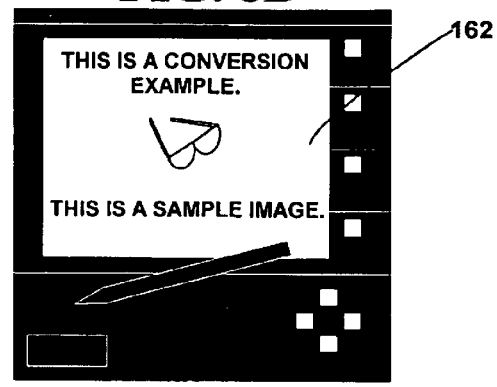

FIGS. 8A and 8B are block diagrams of screen displays 160, 162 illustrating content conversion with preferences.

FIG. 8A illustrates a block diagram of a screen display 160 on a SuperVGA resolution monitor of the original electronic document from Table 10 before application of content conversion Method 146. The image "glasses.jpg" from Table 8 is a color image of sunglasses that are "red" in color. The default font for text displayed in FIG. 8A is a Times Roman font. The HTML document has several comments indicated by HTML comment tags "<! . . . >".

FIG. 8B illustrates a block diagram of a screen display 162 for a converted electronic document for a PDA first network device 12 from Table 11 after application of content conversion Method 146. The PDA display has less than SuperVGA resolution and is grayscale. The default display font for text displayed has been changed to Arial as is illustrated in FIG. 8B. The color image in the file "glasses.jpg" has been changed from color to grayscale and has been reduced in size by 50% by content converter 16. In FIG. 8A, a browser uses the HTML image tag "<IMG src="http://www.spyglass.com/glasses.jpg">" to display the red sunglasses image. In FIG. 8B, a browser in PDA first network device 12 parses the HTML image tag and requests the image. The content converter 16 converts the image based on conversion preferences stored in the database 18, and returns a converted image for display to the PDA first network 12 via the proxy server 14. The proxy server 14 returns a converted grayscale image reduced in size by 50%. The PDA first network device 12 receives a converted image as a result of requesting an original image without additional action by the PDA first network device.

If the requested "glasses image" was part of an image map, a converted HTML tag "<IMG src="http://www.spyglass.com/glasses_spyg$(spyga-image-attr-scale=50).jpg">" as a "virtual URL" is added to the HTML document in Table 11. For example, the virtual URL "glasses spyg$(spyga-image-attr-scale=50)" within the HTML image tag allows an original image from an image map to be scaled to 50% of its original size with the virtual URL. The conversion information within the virtual URL text "image-name_spyg$( . . . ).image_type" is used to scale the image to match the converted image map.

In a preferred embodiment of the present invention, the content converter 16 is closely associated with the proxy server 14. The proxy server 14 acts as an intermediary between a network device requesting an original electronic document and an electronic document server on a network providing an original electronic document. The proxy server 14 intercepts requests for hypertext documents and for hyperlinks within hypertext documents. As a result, when a browser on a user device parses the HTML image tag "<IMG src="http://www.spyglass.com/glasses.jpg">", the proxy server 14 provides a converted grayscale image reduce in size by 50% instead of the original image referenced in the original electronic document with the HTML by calling the content converter 16.

In a preferred embodiment of the present invention, a user sets desired user-conversion preferences by creating a user-conversion preference file on the proxy server 14. In another embodiment of the present invention, a user-conversion preference file is stored on a user device and retrieved by the content converter 16 or the proxy server 14. In yet another embodiment of the present invention, a user-conversion preference file may be stored on a specific site (e.g., on an Internet Service Provider site) and retrieved by the content converter 16 or the proxy server 14. Device-conversion preferences and site-specific preference files are typically created by a system administrator and not by user (e.g. with the administrative interface 38 of FIG. 3).

However, a user may override the device and site-specific conversion preferences as was discussed above, provided user-conversion preferences have the highest precedence in the conversion precedence scheme. In another embodiment of the present invention, a user is allowed to provide device-conversion preferences or site-specific conversion preferences.

Content Conversion Using Data Mining

In a preferred embodiment of the present invention, hypertext electronic document content can be selected from one or more hypertext electronic documents and converted into a format appropriate for display on a user device (e.g., a hand-held device). "Data mining" is used to create a converted hypertext electronic document using selected hypertext elements from one or more other hypertext electronic documents.

Figure 9:
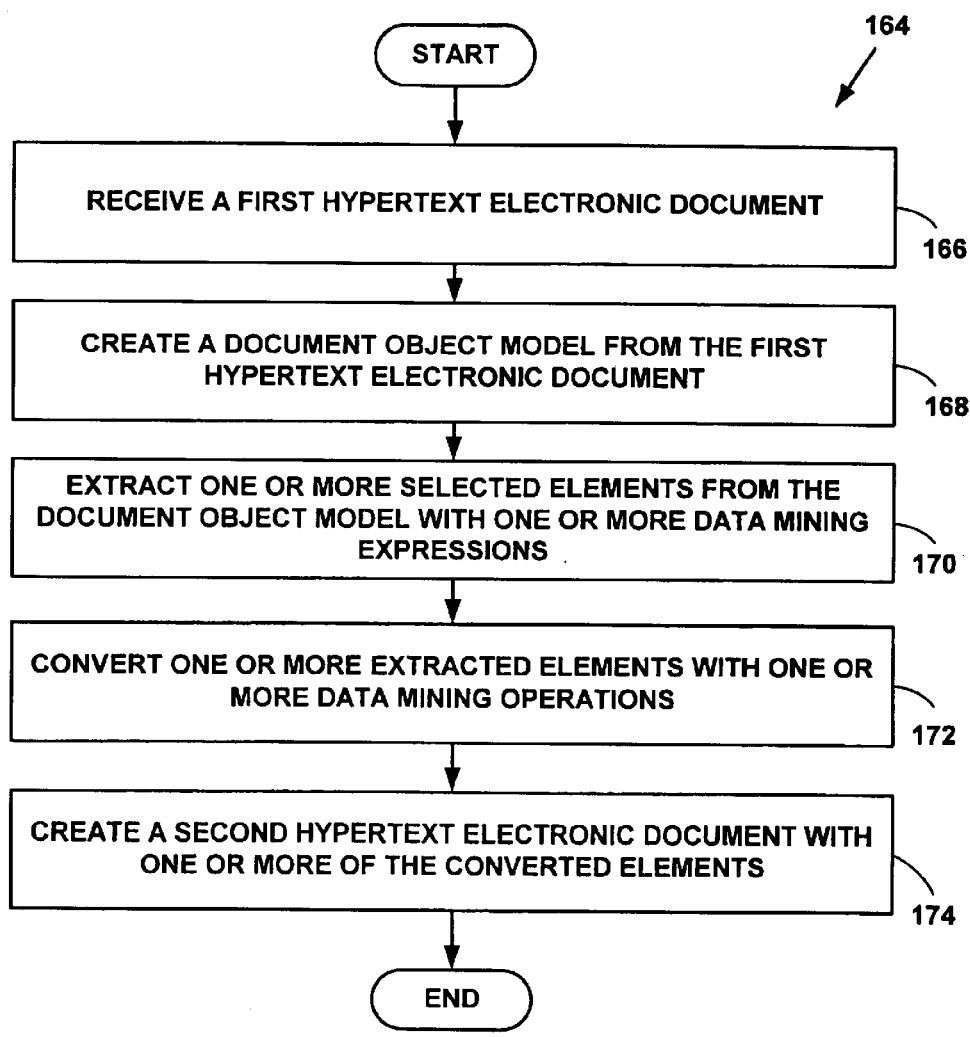
FIG. 9 is flow diagram illustrating a method for content conversion using data mining.

FIG. 9 is flow diagram illustrating a method 164 for content conversion using data mining. At Step 166, a first hypertext electronic document is received on a second network device (e.g., the content converter 16) on a first network, from a third network device (e.g., an electronic document server) on a second network (e.g., the network 20).

At Step 168, a document object model is created from the first hypertext electronic document. In one preferred embodiment of the present invention, creating the document object model includes parsing the first hypertext electronic document to collect hypertext elements present in the first hypertext electronic document. The collected hypertext elements are saved in a hierarchical model used to represent the first hypertext electronic document.

At step 170, one or more selected hypertext elements are extracted from the document object model using one or more data mining expressions. The one or more selected hypertext elements are selected, for example, by a user from one or more electronic document servers on the network 20 (e.g., World-Wide-Web servers on the Internet or an intranet). References to the selected hypertext elements are saved in a symbol table so they can be used in other expressions and/or a document template.

For example, a user may select a first hypertext element (e.g., a table) from a first hypertext electronic document, and a second hypertext element (e.g., a frame) from, a second hypertext electronic document, etc. A user is not limited to selecting hypertext elements from one hypertext electronic document, but can select hypertext elements from virtually any hypertext electronic document on the World-Wide-Web on the Internet or an intranet. In another preferred embodiment of the present invention, the one or more selected hypertext elements are extracted from the document object model using one or more data mining operations included in a conversion script (e.g., a conversion script 118).

At step 172, one or more of the extracted hypertext elements are converted using one or more data mining operations. In one preferred embodiment of the present invention, one or more extracted hypertext elements are combined with a hypertext template to create a second hypertext electronic document.

At step 174, a second hypertext electronic document is created on the second network device including one or more converted hypertext elements. In one preferred embodiment of the present invention, the second hypertext electronic document is in an appropriate format for display on a network device (e.g., the first network device 12) that has a display with less than SuperVGA resolution. In another preferred embodiment of the present invention, the second hypertext electronic document is in an appropriate format for display on a network device that has a display with SuperVGA resolution.

Figure 10:
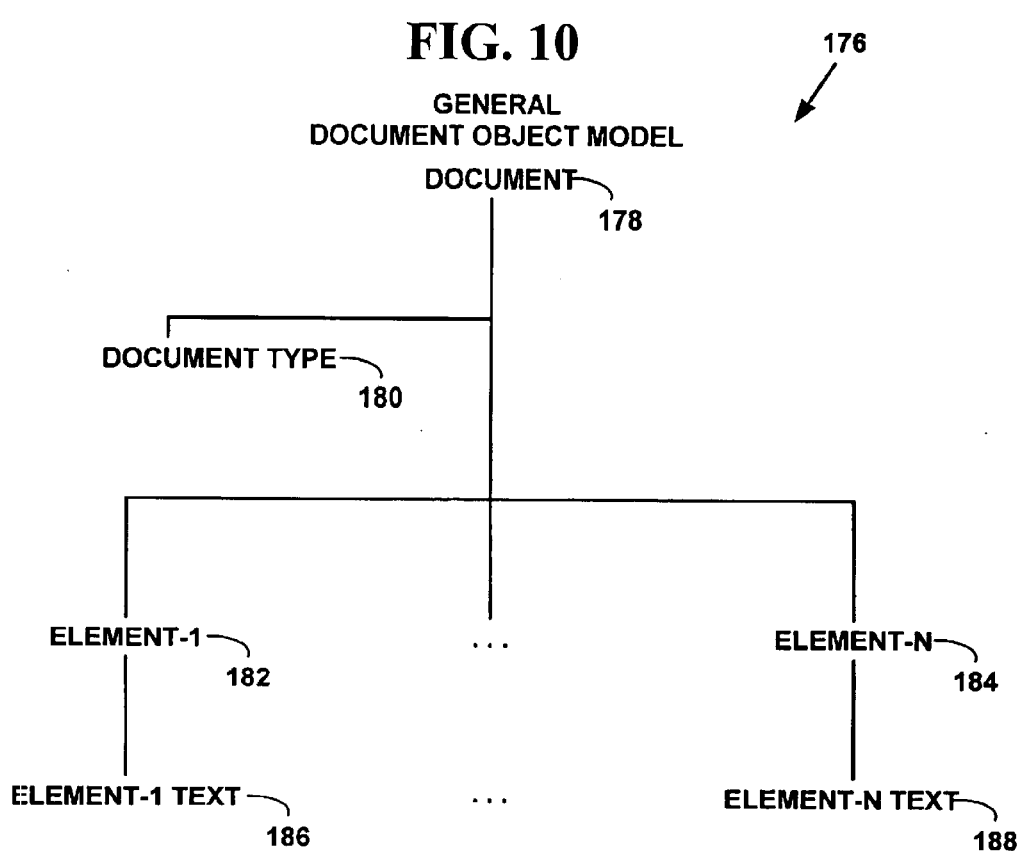
FIG. 10 is a block diagram illustrating a general document object model.

FIG. 10 is a block diagram illustrating a general document object model 176. A general document object model is a hierarchy of nested objects, where each object includes sub-objects, or data. Document models were created to allow scripts such as JavaScript or Visual Basic, by Microsoft, and Java programs to be portable among browsers. However, document object models are also used for hypertext language editors and data repositories.

The general document object model of FIG. 10 comprises components including a document 178, a document type 180, multiple elements 182, 184, two of which are illustrated, and text for elements 186, 188 including sub-elements and attribute values for elements or sub-elements (not illustrated in FIG. 10).

Figure 11:
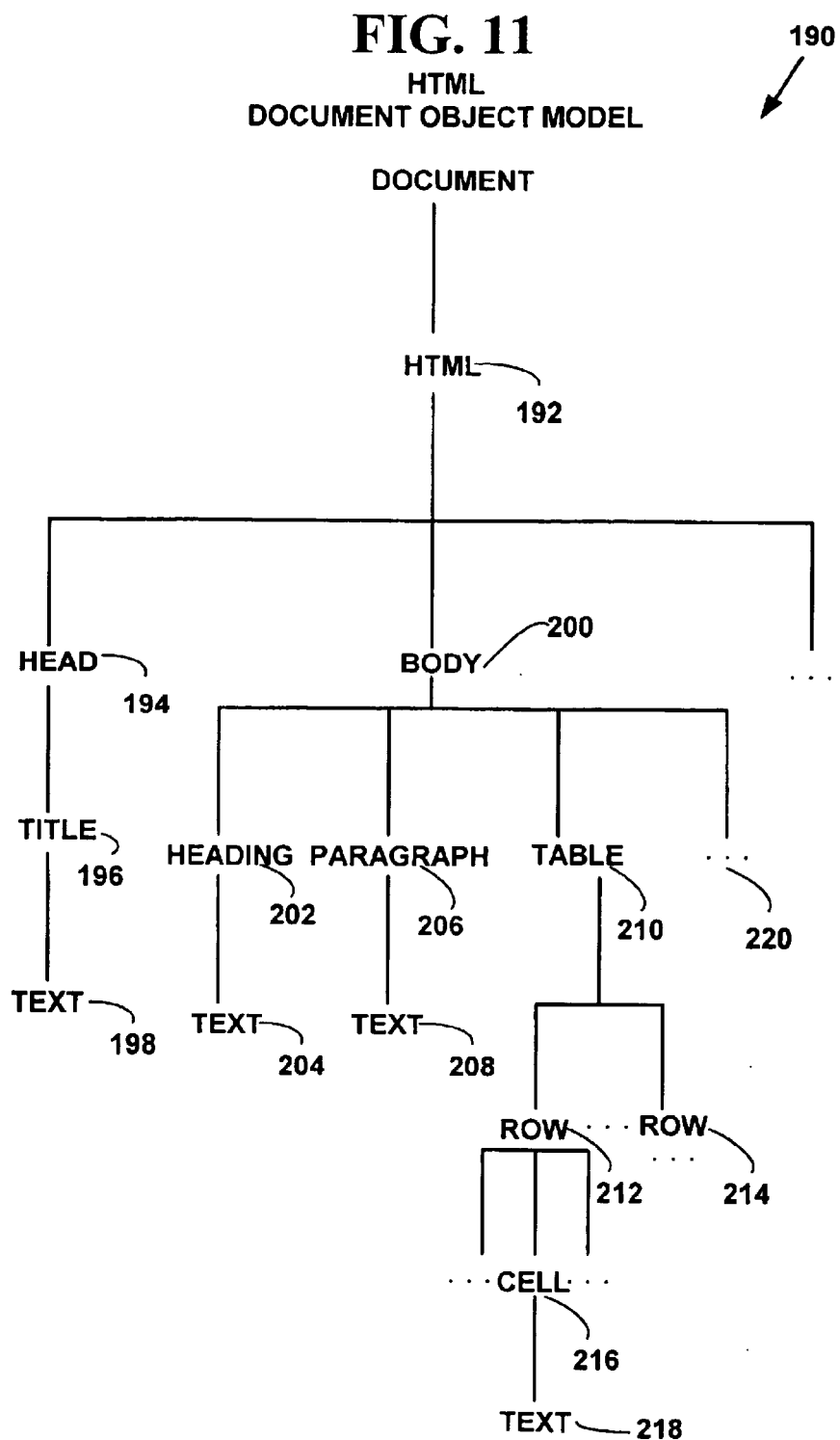
FIG. 11 is a block diagram illustrating a portion of an exemplary Document Object Model for the Hypertext Markup Language.

FIG. 11 is a block diagram illustrating a portion of an exemplary Document Object Model ("DOM") 190 for HTML. For more information on the DOM for HTML see the World-Wide-Web Consortium ("W3C") Document Object Model, incorporated herein by reference. The W3C DOM can be found on the World-Wide-Web at the URL http://www.w3.org." Dynamic HTML by Microsoft was also one immediate ancestor of the W3C Document Object Model. More information on Dynamic HMTL ("DHTML") can be found at the URL "http://www.microsoft.com."

The Document Object Model is an Application Programming Interface ("API") for HTML, XML and other hypertext electronic documents. It defines the logical structure of hypertext electronic documents and how hypertext electronic documents are accessed and manipulated.

With the Document Object Model, programmers can create and build documents, navigate their structure, and add, modify, or delete elements and content. Elements, sub-elements, text, etc. in an HTML or other hypertext electronic documents can be accessed, changed, deleted, or added using the Document Object Model.

Returning to FIG. 11, the exemplary DOM 190 for HTML includes a document type of HTML 192, an HTML element HEAD 194, a HTML HEAD sub-element TITLE 196, and a sub-element text 198 for the sub-element TITLE. HTML element BODY 200 includes sub-element HEADING 202 and text 204. The BODY 200 sub-element PARAGRAPH 206 includes text 208. The BODY 200 sub-element TABLE 210 includes sub-elements ROWS 212, 214. Sub-element ROW 212 includes sub-element CELL 216. Sub-element CELL 216 includes text 218. Additional HTML BODY 200 sub-elements are included in the DOM 190 beginning at 220. Other HTML elements, sub-elements attributes and text are also added to the DOM 190 for HTML, but are not illustrated in FIG. 11.

Figure 12:
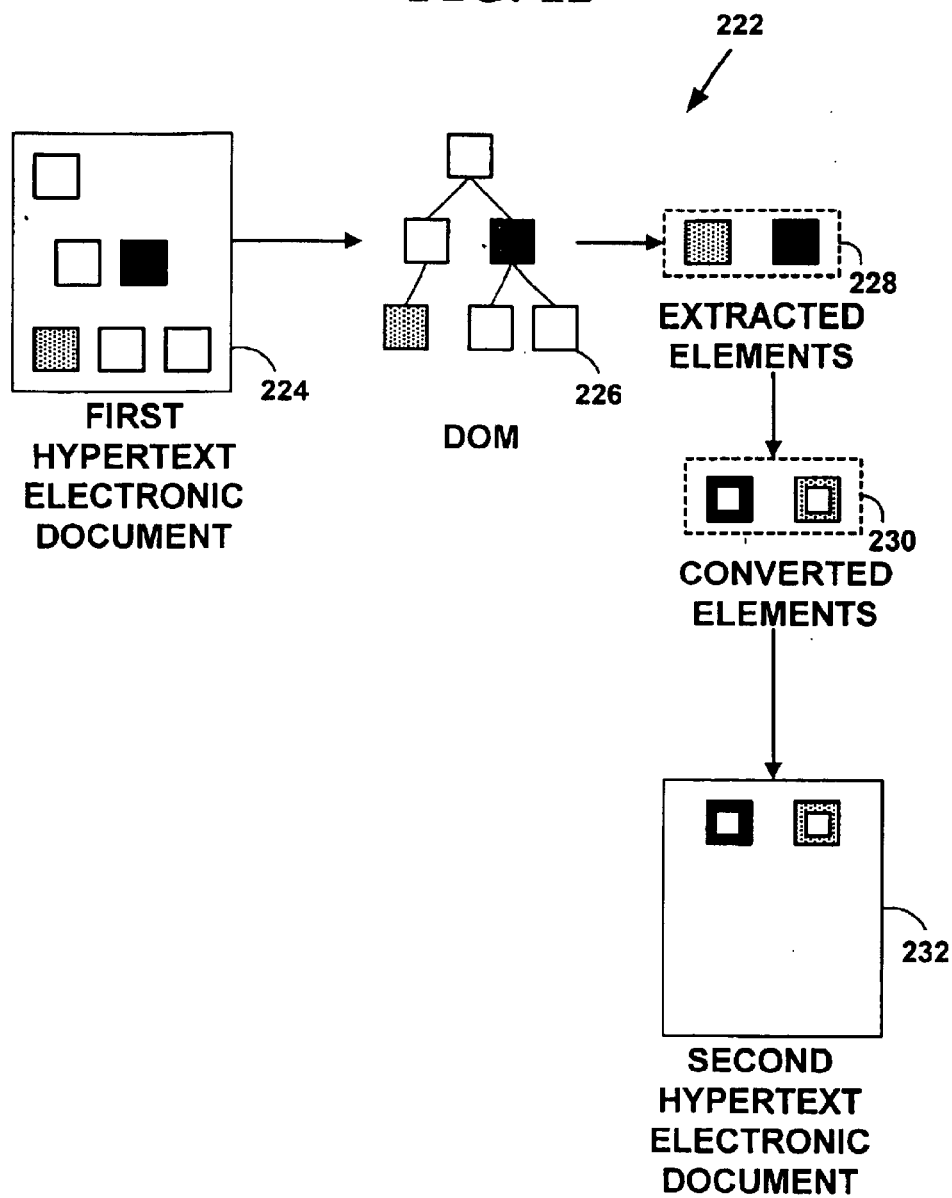
FIG. 12 is a block diagram visually illustrating steps of the method of FIG. 9.

FIG. 12 is a block diagram illustrating a visual view 222 of the steps of the method of FIG. 9. A first hypertext electronic document 224 (FIG. 12) is received at Step 166 (FIG. 9). A document object model 226 (FIG. 12) is created from the first hypertext electronic document at Step 168 (FIG. 9). Exemplary document object models 176 and 190 are illustrated in FIG. 10 and FIG. 11 respectively. One or more selected hypertext elements 228 (FIG. 12) (e.g., HTML table including a baseball box score) are extracted from the document object model 224 at Step 170 (FIG. 9) with one or more data mining expressions. One or more of the extracted hypertext elements 228 are converted into converted elements 230 (FIG. 12) with one or more data mining operations at Step 172 (FIG. 9). At Step 174 (FIG. 9), a second hypertext electronic document 232 (FIG. 12) is created using one or more of the converted elements 230 (FIG. 12) at Step 174.

Table 12 illustrates a data structure for an exemplary abject-oriented class data structure for a HTML DOM. However, other data structures could also be used.

TABLE 12

© by Spyglass, Inc.

```
//Define the implementation class for HtmlObjModel.
Class HtmlObjModelImp : public HtmlObjModel
{
public:
    HtmlObjModelImp(siParsedData* pd);
    dpBuf_ptr eval(const char *expr):
    dpBuf_ptr fill_template(const char* filename);
    virtual ~HtmlObjModelImp( );
private:
    DOM::DocumentContext_ptr          _documentContext;
    DOM::Evaluator_ptr                _evaluator;
};
```

In one exemplary preferred embodiment of the present invention, the HTML conversion operation DOM_CREATE (e.g., Table 4) is used to create a Document Object Model for a HTML hypertext electronic document at Step 168 of method 164 (FIG. 9). At Step 170, the HTML conversion operation DOM_EVAL (e.g., Table 4) evaluates one or more expressions that select one or more hypertext elements from HTML DOM 190. At Step 174, the HTML conversion operation DOM_TEMPLATE creates a new HTML document by inserting hypertext elements selected by DOM_EVAL into an template used to create the second hypertext electronic document. The HTML conversion operation DOM_IMPORT is used to import hypertext elements from one or more other hypertext documents. However, other conversion operations could also be used and other conversion operations could also be used to build document object models for other hypertext languages (e.g., SGML, VRML, and XML).

In one preferred embodiment of the present invention, an additional conversion operation called "DATAMINE" performs the combined functionality of DOM_CREATE, DOM_EVAL and DOM_TEMPLATE. Table 13 illustrates an exemplary DATAMINE conversion operation class object-oriented data structure. However, other data structures could also be used.

TABLE 13

© Spyglass, Inc.

```
//CORBA Implementation server for CCOpDataDOM class.
Class CCOpDataDOMImpl : public_sk_CCOpDataDOM
{
public:
    CCOpDataDOMImpl( );
    virtual ~CCOpDataDOMImpl( ) { };
    // Attribute Methods
    char* name( );
    void name(const char*);
    // Conversion Methods
    void Create(datapipe_ptr pipe);
    void Eval(const char* expression, dpBuf*& buf);
    void FillTemplate(const char* filename, datapipe_ptr& pipe);
    // OpData Methods
    void              impl_release( )    {_reaper_info->
                                          impl_release( ); };
    void              impl_duplicate( ){_reaper_info->
                                         impl_duplicate( ); };
private:
    CORBA::String_var   _name;
    HtmlObjMode_ptr     _html_obj_model;
    REAPER_INFO         _reaper_info;
};
```

At Step 170 of FIG. 9, one or more selected elements are extracted from the DOM. For example, suppose a user is a baseball fan and desires to see only a box score for his/her favorite team on a day-to-day basis. In one preferred embodiment of the present invention, a user can select a desired box score from a sports page on an electronic document server on the World-Wide-Web (e.g., from a newspaper sports page) for daily display on a user device. An exemplary baseball box score format from an exemplary sports page is illustrated in Table 14.

TABLE 14

Final: Fri. Apr. 17, 1998

|  | 1 | 2 | 3 | 4 | 5 | 6 | 7 | 8 | 9 | R | H | E |
|---|---|---|---|---|---|---|---|---|---|---|---|---|
| Chicago-C | 0 | 0 | 0 | 0 | 0 | 0 | 0 | 2 | 0 | 2 | 5 | 0 |
| New York-M | 0 | 1 | 0 | 0 | 0 | 0 | 0 | 0 | 0 | 1 | 3 | 1 |

Exemplary HTML source code to create the baseball box score shown in Table 14 from a portion (e.g., a HTML table) of a first HTML document is illustrated in Table 15. In one exemplary preferred embodiment of the present invention, the baseball box score is stored in an HMTL TABLE sub-element 210 (i.e., a sub-element of the HTML element BODY 200) in the HTML DOM 190. At Step 170 of FIG. 9, the desired table element is located in the DOM 190 from FIG. 11 (e.g., at TABLE 210) and extracted with one or more data mining expressions.

A preferred embodiment of the present invention allows a user the capability not only to select one or more desired hypertext elements to use in a customized hypertext electronic document, but also the capability to alter the content to a format suitable for the user. For example, a user may desire to see the baseball box score illustrated in Table 14 on a Personal Digital Assistant ("PDA"). However, the PDA has a small display that is not capable of displaying the box score in Table 13 without wrapping the display text over several lines making the box score difficult to read. In a preferred embodiment of the present invention, the selected box score can also be converted into a format suitable for display on the PDA.

Suppose the user only desires to determine if his/her favorite team has won or lost a game. Table 16 illustrates a desired box score format suitable for a smaller display on a user's PDA. Table 16 illustrates an abbreviated summary of the original baseball box score suitable for display on the user's PDA.

TABLE 16

Final: Fri. Apr. 17, 1998

|  | Runs | Hits | Errors |
|---|---|---|---|
| Chicago-C | 2 | 5 | 0 |
| New York-M | 1 | 3 | 1 |

A preferred embodiment of the present invention allows the selected hypertext element (e.g., the box score table) to

TABLE 15

```
<TABLE><TR>
    <TD width = "129"><FONT size="-1">Final: Fri. Apr. 17, 1998</FONT></TD>
    <TD width="30" align="center"><FONT size="-1"><B>1</B></FONT></TD>
    <TD width="30" align="center"><FONT size="-1"><B>2</B></FONT></TD>
    <TD width="30" align="center"><FONT size="-1"><B>3</B></FONT></TD>
    <TD width="30" align="center"><FONT size="-1"><B>4</B></FONT></TD>
    <TD width="30" align="center"><FONT size="-1"><B>5</B></FONT></TD>
    <TD width="30" align="center"><FONT size="-1"><B>6</B></FONT></TD>
    <TD width="30" align="center"><FONT size="-1"><B>7</B></FONT></TD>
    <TD width="30" align="center"><FONT size="-1"><B>8</B></FONT></TD>
    <TD width="30" align="center"><FONT size="-1"><B>9</B></FONT></TD>
    <TD width="30" align="center"><FONT size="-1"><B>R</B></FONT></TD>
    <TD width="30" align="center"><FONT size="-1"><B>H</B></FONT></TD>
    <TD width="30" align="center"><FONT size="-1"><B>E</B></FONT></TD>
</TR><TR>
<TD width="129"><FONT size="-1" face="arial"><B>Chicago-C</B></FONT></TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">2</TD>
    <TD WIDTH="30 ALIGN="CENTER">5</TD>
    <TD WIDTH="30 ALIGN="CENTER">0</TD>
</TR><TR>
    <TD width="129"><FONT size="-1" face="arial"><B>New York-M</B></FONT></TD>
    <TD WIDTH="30 ALIGN="CENTER">0</TD>
    <TD WIDTH="30 ALIGN="CENTER">1</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">0</TD>
    <TD WIDTH="30 ALIGN="CENTER">1</TD>
    <TD WIDTH="30 ALIGN="CENTER">3</TD>
    <TD WIDTH="30 ALIGN="CENTER">1</TD>
<TR><TABLE>
``` be converted into a format suitable for display on the PDA (e.g., summary of runs, hits and errors from the original box score).

In one preferred embodiment of the present invention, the data mining expressions and operations are from a data mining conversion language. The data mining conversion language is a set of object-oriented methods that can be used to identify one or more hypertext elements in a hypertext electronic document. They can also be used to obtain text and change attribute values for the hypertext elements.

Table 17 illustrates exemplary data mining object-oriented methods for an exemplary data mining conversion language. However, more or fewer object-oriented methods could also be used in the exemplary data mining conversion language. The object-oriented methods provide component names used to create data mining expressions.

TABLE 17

| Hypertext Element Desired | Method |
|---|---|
| A hypertext electronic document. | document |
| All hypertext elements in a hypertext electronic document. | all |
| The n-th hypertext element in a list. | item (n−1) (Since zero based indexes are used, n−1 returns the nth item) |
| Hypertext elements with a specified tag. | tags ("tag") |
| Hypertext elements that contain an attribute name/value pair. | attributeMatch (name=value[,name=value]) |
| Search for elements with the specified text. | grep("text") |

Table 18 illustrates exemplary object-oriented methods used for sub-elements for an exemplary data mining conversion language. However, more or fewer object-oriented methods could also be used. Depending on a current level in a document object model, a sub-element at one level, may be an element at another level. An element at one-level may also be a sub-element at another level. Thus, the object-oriented methods for sub-elements in Table 18 may also be used for elements at some levels in a document object model.

TABLE 18

| Element | Sub-Element | method |
|---|---|---|
| table | One or all rows of a table. | rows(m) or rows |
| table row | One or all cells in a table row. | cells(m) or cells |
| image map | One or all areas defined in an image map. | areas(m) or areas |
| form | One or all elements in a form. | elements(m) or elements |
| form select | One or all options in a select list. | options(m) or options |
| other (e.g., lists and frames) | One or all sub-elements of an element. | children(m) or children |

The data mining conversion language also includes, for example, methods for getting the text of a hypertext element, getting a value of an attribute for an element, and for searching for text of an element. Exemplary object-oriented methods for getting the text of an element are illustrated with exemplary data mining expressions in Table 19.

TABLE 19

| Task | Sample data mining expression |
|---|---|
| Get the text of a bullet list item. | document.all.tags("BL").item.(n).children (m).text |
| Get the text from a table cell. | document.all.tags("TABLE").item(n).rows (rownum).cells(colnum).text |
| Get the text from all cells in a row. The text is concatenated into one string. | document.all.tags("TABLE").item(n).rows (rownum).text |
| Get the text from all cells in a column. The text is concatenated into one string. | document.all.tags("TABLE").item(n).rows. cells(cellnum).text |
| Get options from a SELECT element. Text is concatenated into one string. | document.all.tags("FORM").item(n). elements.tags("SELECT").item(n).options.text |

As an example, to get the text of a bullet list item with the exemplary data mining expression "document.all.tags ("BL").item(n).children(m).text," the object-oriented method "document" (Table 17) is combined with the methods "all" (Table 17), "tags" (Table 17), for the HTML bullet list tag "BL," "item" (Table 17), "children" (Table 18) and "text" (Table 18). The data mining language expression (e.g., Table 19) obtains text from all HTML bullet list tags, including nested tags in a HTML document. The other data mining expressions in Table 19 are created in a similar manner to obtain text from HTML tables and forms.

Object-oriented methods for getting a value for an attribute of hypertext element using data mining expressions are illustrated with exemplary data mining expressions in Table 20. The exemplary data mining expressions combine object-oriented methods from Table 17 and Table 18.

TABLE 20

| Task | Sample data mining expression |
|---|---|
| Get the color of visited hyperlinks | document.all.tags("BODY").getAttribute ("vlink") |
| Get the URL of an anchor | document..all.tags("A").item(n).get-Attribute("href") |
| Get the URL associated with an area in an image map | document.all.tags("MAP").areas(area-num).getAttirbute("href") |
| Get the URL of a form | document.all.tags("FORM").item(n).get-Attribute("action") |

One object-oriented method for searching for text of a hypertext element using data mining expressions are illustrated with an exemplary data mining expression in Table 21. The text search method searches for a specified string and returns all elements that contain it. As a result, duplicate text information may be returned if the text search method is not used at the bottom of the element hierarchy in the DOM.

TABLE 21

| Task | Sample data mining expression |
|---|---|
| Search in a frame for an element containing the text "Contents." | Document.all.tags("FRAME").grep ("CONTENTS") |

In one preferred embodiment of the present invention, data mining expressions are created automatically when a user or other application program selects desired hypertext elements from one or more hypertext electronic documents.

A user is provided a data mining conversion interface that allows a user to format a hypertext element with an input device (e.g., with a Graphical User Interface ("GUI") and a mouse). In such an embodiment, a user selects, and/or "cuts and pastes" desired hypertext elements.

In another preferred embodiment of the present invention, a user creates the data mining expression manually and stores them in a file that is used to create a converted electronic document appropriate for displaying on the user device (e.g., a PDA). In such an embodiment, a user may have additional flexibility and can create appropriate customized data mining expressions.

Exemplary data mining expressions used to converted the exemplary box score from Table 14 into the converted box score in Table 16 is illustrated in Table 22.

TABLE 22

Date=document.all.tags("TABLE").item(2).rows(0).cells;
Team1=document.all.tags("TABLE").item(2).rows(1).cells(0).text;
Team1_runs=document.all.tags("TABLE").item(2).rows(1).cells(10).text;
Team1_hits=document.all.tags("TABLE").item(2).rows(1).cells(11).text;
Team1_errors=document.all.tags("TABLE").item
(2).rows(1).cells(12).text;
Team2=document.all.tags("TABLE").item(2).rows(2).cells(0).text;
Team2_runs=document.all.tags("TABLE").item(2).rows(2).cells(10).text;
Team2_hits=document.all.tags("TABLE").item(2).rows(2).cells(11).text;
Team2_errors=document.all.tags("TABLE").item
(2).rows(2).cells(12).text;

Table 22 illustrates data mining conversion variables including Date, Team1, Team1_runs, Team1_hits, Team1_errors, Team2, Team2_runs, Team2_hits, and Team2_errors. These variables are used to indicate data mining substitutions obtained from data mining conversion expressions.

Table 23 illustrates exemplary source code for a portion of a HTML document template using the data mining conversion expressions in Table 22. One or more data mining conversion operations will be applied to the portion of the HTML document template illustrated in Table 23 to convert the data mining conversion variables illustrated with the characters "&%."

trated in Table 14 by a data mining conversion operation. The characters "&%" are used to indicate data mining conversion variables referenced from the data mining expressions in Table 23.

Additional data mining conversion operations are used to convert the data mining conversion variables back into hypertext data that can be displayed by a browser. For example, the data mining conversion variable "&% Date;" is used to return date information (e.g., Final: Fri. Apr. 17, 1998) from a portion of the first hypertext electronic document illustrated in Table 15.

In one preferred embodiment of the present invention, exemplary data mining conversion operations include reformatting a hypertext element, locating data mining conversion variables, obtaining a replacement hypertext element for a data mining conversion variable and replacing data mining conversion variables with replacement hypertext elements. However, more or fewer data mining operations can also be used and the present invention is not limited to the data mining conversion operations listed.

Data mining conversion variables with a prefix of "&%" are replaced with values obtained from hypertext elements from the first hypertext electronic document using the exemplary data mining conversion expressions. For example, as the HTML line <TD width="100"><FONT size="-1" face="Arial">&%Team1;</TD> (e.g., Table 23) is converted, the data mining conversion variable "%&Team1;" is replaced with an original hypertext element for the "&%Team1;" data mining conversion variable (e.g., "Chicago-C") obtained from the first hypertext electronic document using the exemplary data mining conversion expressions.

The converted HTML line <TD width="100"><FONT size="-1" face="Arial">Chicago-C;</TD> is saved in the second hypertext electronic document. Other data mining data mining conversion variables are serviced in a similar manner by Method 164 and saved in the second hypertext electronic document to produce the box score in converted format whose output is illustrated in Table 16. The first network device 12 is sent the second hypertext electronic document in response to the request for the first hypertext electronic document. The second hypertext electronic document includes one or more converted hypertext elements.

TABLE 23

```
<TABLE><TR>
<TD colspan="4" align="center".
    <FONT size=3 face="Arial"><B>Final: &%Date;</B></FONT></TD>
</TR><TR>
    <TD width="100"></TD.
    <TD width="30" align="center"><FONT size="-1" face="Arial"><B>Runs</B></TD>
    <TD width="30" align="center"><FONT size="-1" face="Arial"><B>Hits</B></TD>
    <TD width="30" align="center"><FONT size="-1" face="Arial"><B>Errors</B></TD>
</TR><TR>
<TD width="100"><FONT size="-1" face="Arial">&%Team1;</TD>
<TD width="30" align="center">
    <FONT size="-1" face="Arial">&%Team1_runs;</TD>
<TD width ="30" align="center"><FONT size="-1" face="Arial">&%Team1_hits;>/TD>
<TD width="30" align="center">
    FONT size="-1" face="Arial">&%Team1_errors;</TD>
</TR><TR>
<TD width="100"><FONT size="-1" face="Arial">&%Team2;</TD>
<TD width="30" align="center">
    <FONT size="-1" face="Arial">&%Team2_runs;</TD>
<TD width ="30" align="center"><FONT size="-1" face="Arial">&%Team2_hits;>/TD>
<TD width="30" align="center">
    FONT size="-1" face="Arial">&%Team2_errors;</TD>
</TR><TABLE>
```

The format of the hypertext elements (i.e., the HTML table) is changed to reflect the desired display output illus- In one preferred embodiment of the present invention, the second hypertext electronic document generated is a "dynamic" template. Data mining conversion variables (e.g., "&%variable;") provide dynamic hypertext elements that are obtained by Method 164.

In another preferred embodiment of the present invention, method 164 of FIG. 9 is used in conjunction with other content conversion methods discussed above (method 146 of FIG. 7). In such an embodiment, a user is able to select one or more hypertext elements from one or more hypertext electronic documents and convert the one or more hypertext elements using data mining conversion operations. In addition, a user can apply one or more conversion operations based on user-conversion preferences, device-conversion preferences or site-specific conversion preferences to further alter selected hypertext elements.

Preferred embodiments of the present invention allow a user to select one or more hypertext elements from one or more hypertext electronic documents. A user is allowed to select desired display information defined by a hypertext element, extract and convert the display information in a format appropriate for display a user device such as a hand-held device, wireless phone, or other device. Data mining is used to extract and convert the selected hypertext information.

Mining data from hypertext electronic documents may allow faster display of hypertext electronic documents for hand-held devices and other devices with less memory, less processing power, or a display with less than SuperVGA resolution. However, data mining can also be used for display with SuperVGA resolution. Thus, the methods of systems of preferred embodiments of the present invention may provide improved user satisfaction for viewing hypertext electronic documents from hand-held devices or other devices.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. In a first network with a plurality of network devices connected to a second network with a plurality of network devices, a method of content conversion for display on a first network device on the first network, comprising:

receiving a first hypertext electronic document on a second network device on a first network, from a third network device on a second network;

creating a document object model from the first hypertext electronic document;

extracting one or more selected hypertext elements from the document object model using one or more data mining expressions from a data mining conversion language comprising a set of methods operable to identify at least one of the one or more hypertext elements in the hypertext electronic document;

converting one or more extracted hypertext elements using one or more data mining operations from the data mining conversion language to generate one or more conversion variables corresponding to the one or more extracted hypertext elements, respectively;

creating a second hypertext electronic document including the extracted hypertext elements on the second network device based on a document template including the data mining conversion variables, wherein the data mining conversion variables are identifiable in the document template by a prefix including "&%" characters; and sending the second hypertext electronic document to the first network device on the first network for display.

\* \* \* \* \*